US012227001B2

(12) United States Patent
Baba et al.

(10) Patent No.: US 12,227,001 B2
(45) Date of Patent: Feb. 18, 2025

(54) IMAGE FORMING APPARATUS

(71) Applicant: FUJIFILM Business Innovation Corp., Tokyo (JP)

(72) Inventors: Toshiaki Baba, Kanagawa (JP); Tomoaki Yoshioka, Kanagawa (JP); Satoshi Shigezaki, Kanagawa (JP); Yoko Miyamoto, Kanagawa (JP); Tomohiro Wada, Kanagawa (JP); Haruka Kobayashi, Kanagawa (JP); Kazuyoshi Hagiwara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/864,357

(22) Filed: Jul. 13, 2022

(65) Prior Publication Data

US 2023/0123189 A1 Apr. 20, 2023

(30) Foreign Application Priority Data

Oct. 15, 2021 (JP) ................................ 2021-169889

(51) Int. Cl.
*B41J 13/22* (2006.01)
*B41J 13/00* (2006.01)
(Continued)

(52) U.S. Cl.
CPC ........... *B41J 13/22* (2013.01); *B41J 13/0027* (2013.01); *B41J 13/08* (2013.01); *B41J 13/106* (2013.01);
(Continued)

(58) Field of Classification Search
CPC ........ B41J 13/22; B41J 13/0027; B41J 13/08; B41J 13/106; B41J 2/01; B41J 13/223;
(Continued)

(56) References Cited

U.S. PATENT DOCUMENTS 9,389,569 B2 7/2016 Ishikawa
2008/0199229 A1* 8/2008 Fujita ................ G03G 15/2042 399/307
(Continued)

FOREIGN PATENT DOCUMENTS

JP 2935581 B2 * 8/1999 .............. B65H 1/14
JP 2013072899 4/2013
(Continued)

*Primary Examiner* — Yaovi M Ameh
(74) *Attorney, Agent, or Firm* — JCIPRNET

(57) ABSTRACT

An image forming apparatus includes a holding body that holds a formed image; a transport unit that transports a recording medium in a state where a tip of the recording medium is grasped by a grasping portion; a transfer cylinder that has a substantially circular cross section, and that includes a concave portion that accommodates the grasping portion in a direction substantially orthogonal to a rotation direction and transfers an image on the holding body to the recording medium transported by the transport unit by interposing the recording medium transported by the transport unit between the transfer cylinder and the holding body; and an imparting portion that imparts a transport load to the recording medium that is transported to a transfer position at which the image on the holding body is transferred to the recording medium.

20 Claims, 22 Drawing Sheets

(51) Int. Cl.

| | |
|---|---|
| ***B41J 13/08*** | (2006.01) |
| ***B41J 13/10*** | (2006.01) |
| ***G03G 15/00*** | (2006.01) |
| *B41J 2/01* | (2006.01) |
| *G03G 15/20* | (2006.01) |

(52) U.S. Cl.
CPC ............. *G03G 15/6529* (2013.01); *B41J 2/01* (2013.01); *B41J 2002/012* (2013.01); *B41J 13/223* (2013.01); *G03G 15/206* (2013.01)

(58) Field of Classification Search
CPC ........... B41J 2002/012; G03G 15/6529; G03G 15/206
See application file for complete search history.

(56) References Cited

U.S. PATENT DOCUMENTS

| | | | | |
|---|---|---|---|---|
| 2009/0116880 A1* | 5/2009 | Takagaki | ............... | G03G 15/24 399/307 |
| 2013/0078012 A1 | 3/2013 | Sato et al. | | |
| 2014/0199089 A1* | 7/2014 | Ishikawa | ............ | G03G 15/6558 399/45 |

FOREIGN PATENT DOCUMENTS

| | | | |
|---|---|---|---|
| JP | 2014134719 | 7/2014 | |
| JP | 2020140062 A * | 9/2020 | ........... B65H 29/005 |

* cited by examiner

EXAMPLE OF STATE OF RECORDING MEDIUM P IN CASE WHERE SLIDING MEMBER 60 IS NOT PRESENT

EXAMPLE OF STATE OF RECORDING MEDIUM P IN CASE WHERE SLIDING MEMBER 60 IS PRESENT

IN CASE WHERE SHEET MEMBER 100A THAT IT NOT PROVIDED WITH TAPERED SURFACE 104 IS USED $\theta 2 < \theta 1$

IMAGE FORMING APPARATUS

CROSS-REFERENCE TO RELATED APPLICATIONS

This application is based on and claims priority under 35 USC 119 from Japanese Patent Application No. 2021-169889 filed Oct. 15, 2021.

BACKGROUND

(i) Technical Field

The present invention relates to an image forming apparatus.

(ii) Related Art

JP2013-072899A discloses an image forming apparatus including a tip gripper that grasps a tip portion of a recording material in a transport direction that is transported toward a transfer site and a paper restraining unit that is disposed to face an outer circumferential surface of a transfer drum and is movable relative to the transfer drum, and prevents a rear end portion of the recording material in the transport direction grasped by the tip gripper from floating.

JP2014-134719A discloses an image forming apparatus including a holding member located upstream of a secondary transfer position in a moving direction of an intermediate transfer belt and rotatably disposed in contact with an inner circumferential surface of the intermediate transfer belt and in which the holding member is disposed with a relationship of $L2/L1 \leq 0.5$ in a case where a distance between the secondary transfer position and a tip of a recording medium guide member is L1, and a distance between the secondary transfer position and a contact position between the holding member and an inner circumferential surface of the intermediate transfer belt is L2.

SUMMARY

In a large image forming apparatus, a configuration is used in which an image on a holding body such as an intermediate transfer body is transferred to a recording medium by transporting the recording medium with a holding portion that holds a tip of the recording medium such as paper accommodated in a concave portion of a transfer cylinder. In the image forming apparatus having such a configuration, since the tip of the recording medium is held at a position inside a surface of the transfer cylinder, the recording medium may float without being in close contact with the transfer cylinder. Then, in a case where the recording medium floats from the transfer cylinder, the recording medium and the intermediate transfer body come into contact with each other before the recording medium enters a transfer position, and there is a possibility that transfer deviation may occur in the image transferred.

Aspects of non-limiting embodiments of the present disclosure relate to an image forming apparatus capable of suppressing floating of a recording medium from a transfer cylinder as compared with a case where no transport load is imparted to the recording medium, in a case where an image on a holding body is transferred to the recording medium by transporting the recording medium in a state where a tip of the recording medium is held at a position inside a surface of the transfer cylinder.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including a holding body that holds a formed image; a transport unit that transports a recording medium in a state where a tip of the recording medium is grasped by a grasping portion; a transfer cylinder that has a substantially circular cross section, and that includes a concave portion that accommodates the grasping portion in a direction substantially orthogonal to a rotation direction and transfers an image on the holding body to the recording medium transported by the transport unit by interposing the recording medium transported by the transport unit between the transfer cylinder and the holding body; and an imparting portion that imparts a transport load to the recording medium that is transported to a transfer position at which the image on the holding body is transferred to the recording medium.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the invention will be described in detail with reference to the drawings. For convenience of explanation, a direction along an arrow H shown in FIG. 1 is a vertical direction of an image forming apparatus 10, a direction along an arrow W is a width direction of the image forming apparatus 10, and a direction along an arrow D is a front-back direction of the image forming apparatus 10.

Figure 1:
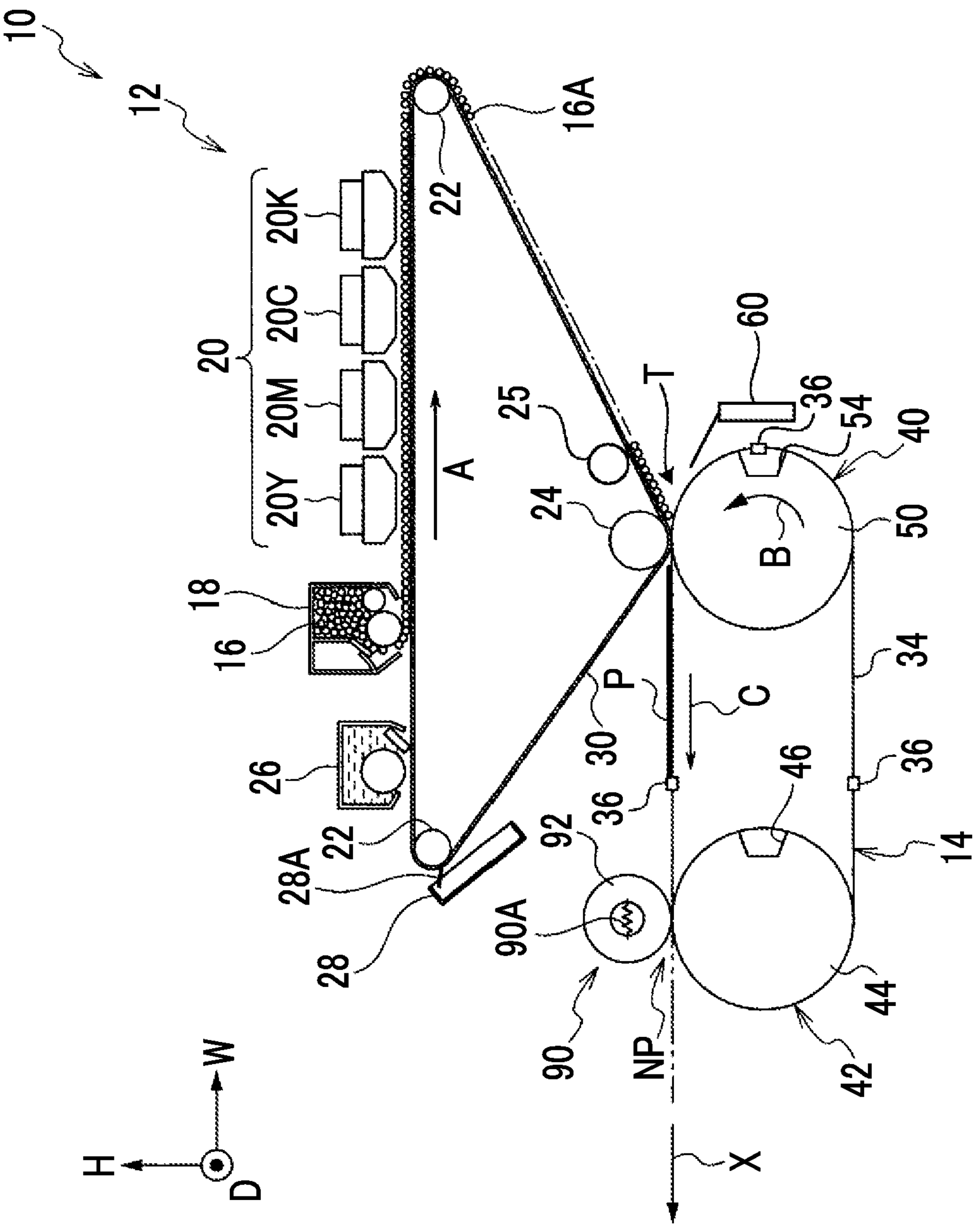
FIG. 1 is a schematic diagram showing a configuration of an image forming apparatus 10 according to an exemplary embodiment of the present invention.

FIG. 1 shows a case where the image forming apparatus 10 forms an ink image on a recording medium P by an ink-jet method as an example. The image forming apparatus 10 includes an image forming unit 12, a transport unit 14, and a fixing device 90.

Hereinafter, the image forming unit 12, the transport unit 14, and the fixing device 90 of the image forming apparatus 10 will be described, and then a transfer cylinder 50 as an example of a cylinder member will be described.

Image Forming Unit 12

As shown in FIG. 1, the image forming unit 12 has a function of forming an ink image on the recording medium P. Specifically, the image forming unit 12 includes a transfer belt 30 as an example of an intermediate transfer body, two rolls 22, an opposing roll 24 as an example of a rotating member, a pressure-sensitive adhesive layer forming device 26, a particle supply device 18, a discharge head 20, a transfer body 40, and a cleaner 28.

The transfer belt 30 is formed in an endless shape and is wound around the two rolls 22, the opposing roll 24, and a support roll 25 so as to have an inverted triangular posture in a case where the transfer belt 30 is viewed from the front-back direction. The transfer belt 30 has a belt shape, and is configured to circumferentially move in a direction of an arrow A by rotationally driving at least one of the two rolls 22.

The pressure-sensitive adhesive layer forming device 26, the particle supply device 18, the discharge head 20, the transfer body 40, and the cleaner 28 are disposed in this order on an outer circumferential surface side of the transfer belt 30 from an upstream side of the transfer belt 30 in a circumferential direction (hereinafter, referred to as "belt circumferential direction").

The pressure-sensitive adhesive layer forming device 26 is disposed at one end (left side in the figure) in the width direction of the apparatus in a horizontal portion of the transfer belt 30 having the inverted triangular posture. The pressure-sensitive adhesive layer forming device 26 contains a pressure-sensitive adhesive inside, and is configured to form a pressure-sensitive adhesive layer (not shown) by applying a pressure-sensitive adhesive to an outer circumferential surface of the transfer belt 30 that circumferentially moves. As the pressure-sensitive adhesive, for example, glue, an organic solvent, or the like may be used.

The particle supply device 18 is disposed on a downstream side (right side in the figure) in the belt circumferential direction with respect to the pressure-sensitive adhesive layer forming device 26 in the horizontal portion of the transfer belt 30. The particle supply device 18 contains ink-accepting particles 16 capable of accepting ink droplets, and is configured to supply the ink-accepting particles 16 to the transfer belt 30 on which the pressure-sensitive adhesive layer is formed.

That is, the ink-accepting particles 16 supplied on the transfer belt 30 by the particle supply device 18 are adhered to the pressure-sensitive adhesive layer by a pressure-sensitive adhesive force of the pressure-sensitive adhesive layer to form an ink-accepting particle layer 16A on the transfer belt 30.

The discharge head 20 is disposed on a downstream side (right side in the figure) in the belt circumferential direction with respect to the particle supply device 18 in the horizontal portion of the transfer belt 30. A plurality of the discharge heads 20 are provided so as to form an ink image for each color. In the present exemplary embodiment, the discharge heads 20 having four colors of yellow (Y), magenta (M), cyan (C), and black (K) are provided. In FIG. 1, alphabetic characters Y, M, C, and K are added after the reference numeral 20 corresponding to each of the above colors.

Further, the discharge head 20 of each color is configured to discharge ink droplets from a nozzle (not shown) onto the ink-accepting particle layer 16A by a known method such as a thermal method and a piezoelectric method to form an ink image based on image data. That is, the ink droplets discharged from the discharge head 20 of each color are configured to form an ink image by being accepted by the ink-accepting particle layer 16A.

As described above, the transfer belt 30 functions as a holding body that holds the formed image.

Figure 2:
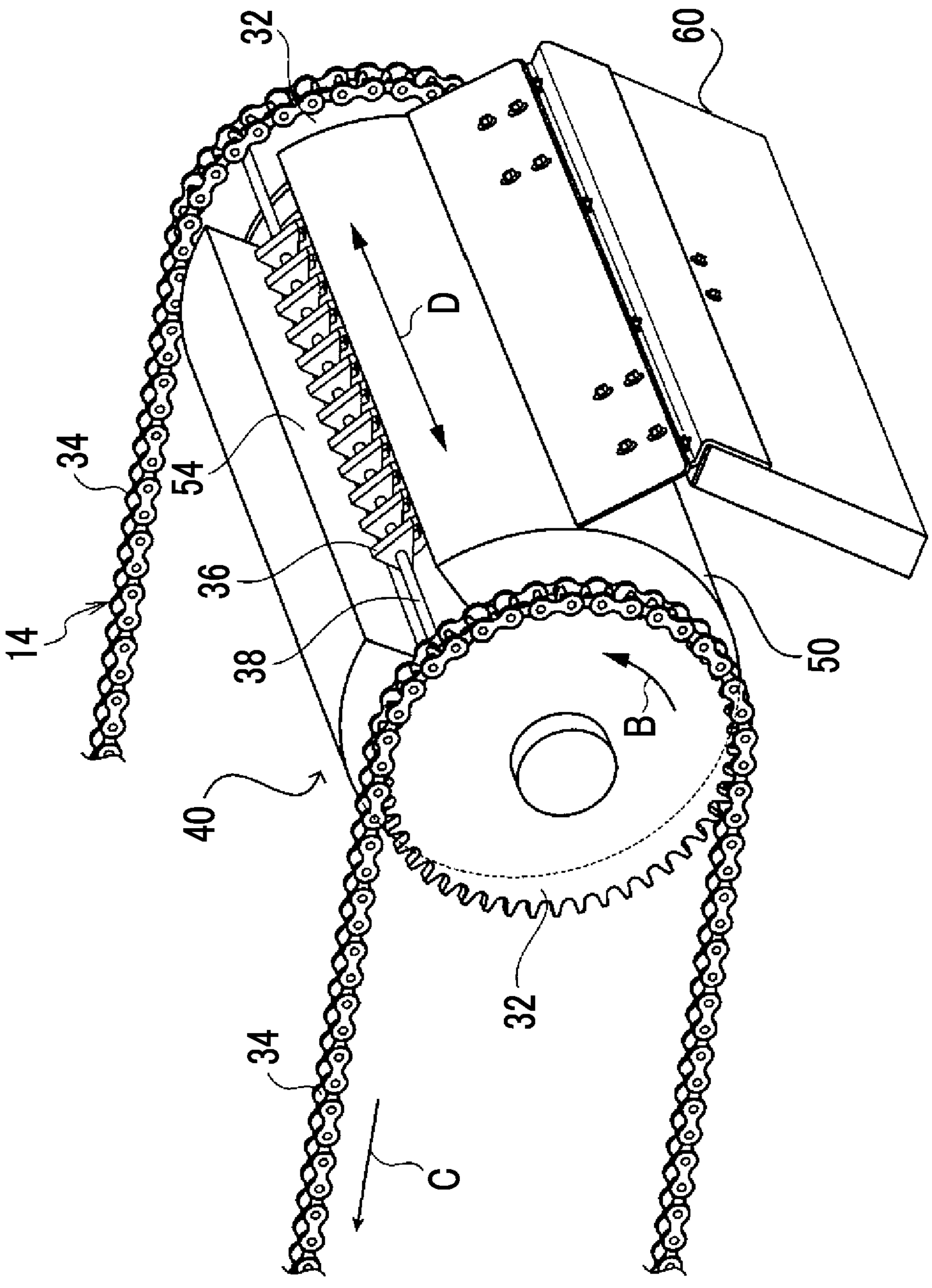
FIG. 2 is a perspective diagram showing a configuration of a transfer body 40 according to an exemplary embodiment of the present invention.

The transfer body 40 is disposed on a lower side of the transfer belt 30. As shown in FIG. 2, the transfer body 40 has a transfer cylinder 50 disposed such that an axial direction is the same as an axial direction of the opposing roll 24, and a sliding member 60 disposed close to the transfer cylinder 50. The transfer cylinder 50 is disposed to face the transfer belt 30, and forms a nipping region T in which the transfer belt 30 is interposed with the opposing roll 24 therebetween. That is, the opposing roll 24 forms the nipping region T, which is a transfer position, by pressing the transfer belt 30 from the inside. The details of the sliding member 60 will be described later.

In the present exemplary embodiment, the ink image formed in the ink-accepting particle layer 16A is transported to the nipping region T by circumferential movement of the transfer belt 30, and the recording medium P is transported to the nipping region T by the transport unit 14. Then, the transfer cylinder 50 transfers the ink image to the recording medium P by interposing and pressing the recording medium P and the ink image transported to the nipping region T between the transfer cylinder 50 and the transfer belt 30.

In FIG. 1, the transport direction of the recording medium P is indicated by an arrow X. Further, in the nipping region T, when the recording medium P and the ink image are interposed and pressed between the transfer cylinder 50 and the transfer belt 30, the recording medium P and the ink image may be heated by the transfer cylinder 50. Further, a recess 54, which is a concave portion for accommodating a gripper 36 and a support member 38, which will be described later, is formed on a part of the outer circumferential surface of the transfer cylinder 50.

The configuration of the transfer body 40 in the present exemplary embodiment will be described with reference to the perspective diagram of FIG. 2. As shown in FIG. 2, a pair of sprockets 32 are provided on both ends of the transfer cylinder 50 in the axial direction. The pair of sprockets 32 are disposed coaxially with the transfer cylinder 50, and are configured to rotate integrally with the transfer cylinder 50. The transfer cylinder 50 is configured to be rotationally driven by a drive unit (not shown). Chains 34 are wound around the pair of sprockets 32.

Further, the sliding member 60 functions as an imparting portion that imparts a transport load to the recording medium P that is transported to the transfer position at which the image on the transfer belt 30 is transferred to the recording medium P. Specifically, the sliding member 60 is disposed in close proximity without coming into contact with the surface of the transfer cylinder 50, and is configured to slide with respect to the recording medium transported. Here, sliding means a state where two objects are moving while touching each other.

Further, the fact that the sliding member 60 and the transfer cylinder 50 are disposed close to each other means that the sliding member 60 and the transfer cylinder 50 do not come into direct contact with each other while the recording medium P is not transported, and in a case where the recording medium P is transported in a floating state without being in close contact with the transfer cylinder 50, the recording medium P and the sliding member 60 are disposed at an interval such that the recording medium P and the sliding member 60 come into contact with each other. However, in the case where the recording medium P is thin and is in close contact with the transfer cylinder 50, the interval between the sliding member 60 and the transfer cylinder 50 may be set such that the sliding member 60 does not come into contact with the recording medium P.

As shown in FIG. 1, the cleaner 28 is disposed on the downstream side in the belt circumferential direction with respect to the nipping region T and on the upstream side in the belt circumferential direction with respect to the pressure-sensitive adhesive layer forming device 26. The cleaner 28 includes a blade 28A that is in contact with an outer circumferential surface of the transfer belt 30. The cleaner 28 is configured to remove the pressure-sensitive adhesive layer, the ink-accepting particles 16, ink, and other foreign substances (for example, in a case where the recording medium P is paper, paper dust, or the like) remaining on the transfer belt 30 after passing through the nipping region T, with the blade 28A as the transfer belt 30 circumferentially moves.

The opposing roll 24 is configured to be movable between a contact position that comes into contact with the transfer cylinder 50 and a separation position that is separated from the transfer cylinder 50 by a transfer movement mechanism (not shown) using a cam or the like. Specifically, the opposing roll 24 is, for example, always pressed or pulled to the contact position by an elastic force of an elastic member such as a spring, and is configured to move to the separation position against the elastic force by the transfer movement mechanism.

The support roll 25 for supporting the transfer belt 30 is disposed on the upstream side of the opposing roll 24 in the transport direction. By moving the position where the support roll 25 is disposed closer to or farther from the opposing roll 24, it is possible to adjust the pressure and area of the contact region between the transfer belt 30 and the transfer cylinder 50.

As described above, the transfer cylinder 50 has a substantially circular cross section, and the recess 54 for accommodating the gripper 36 is provided in a direction substantially orthogonal to the rotation direction. Then, the transfer cylinder 50 transfers the image on the transfer belt 30 to the recording medium P transported by the transport unit 14 by interposing the recording medium P transported by the transport unit 14 between the transfer cylinder 50 and the transfer belt 30. In addition, substantially orthogonal means a state where an angle formed by two directions is in a range of 85 to 95 degrees.

Fixing Device 90

As shown in FIG. 1, the fixing device 90 is a device for fixing the ink image transferred to the recording medium P to the recording medium P. Specifically, the fixing device 90 has a pressurizing body 42 disposed on the downstream side of the transport unit 14 in the transport direction of the recording medium P, and a heating roll 92.

Figure 3:
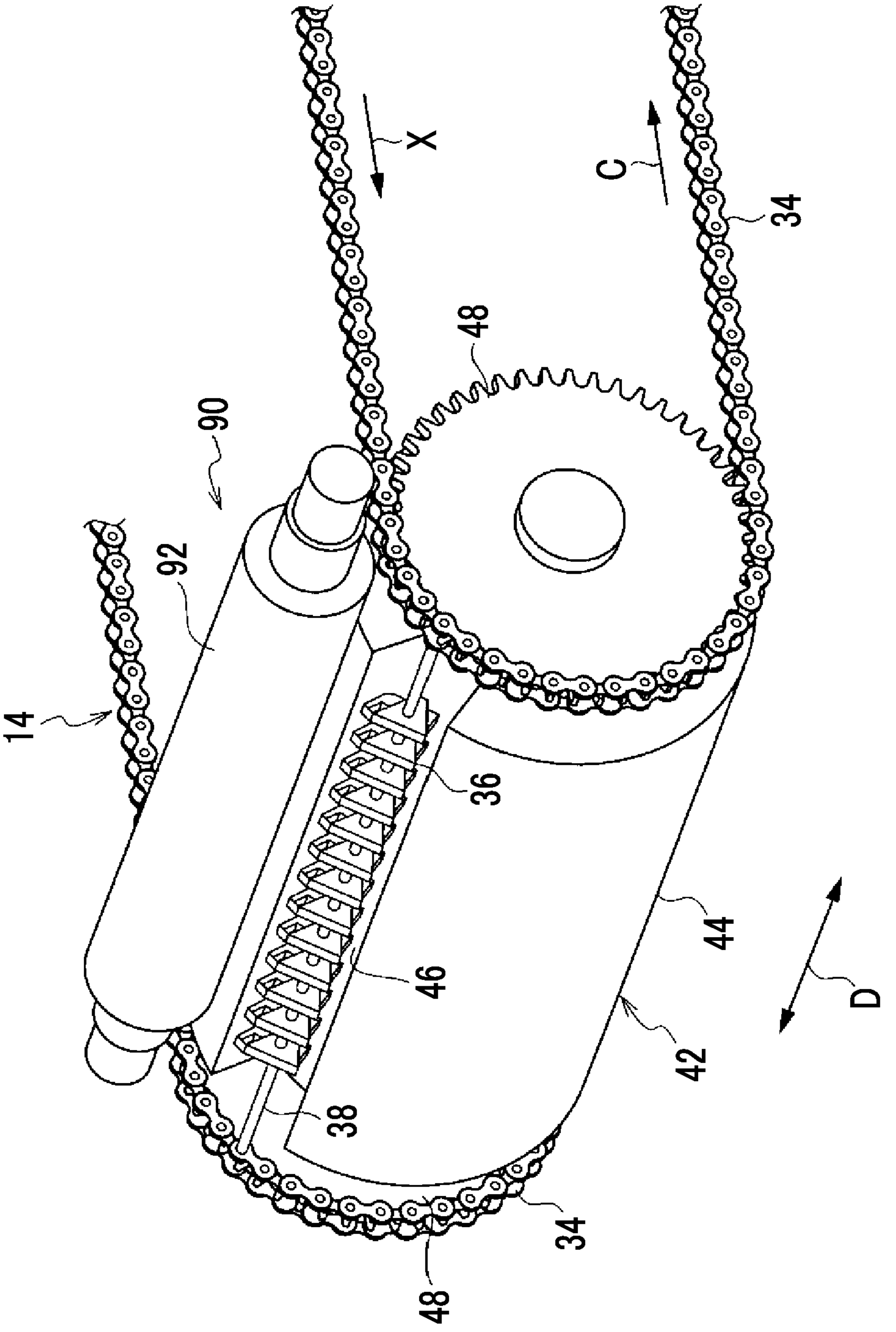
FIG. 3 is a perspective diagram showing a configuration of a fixing device 90 according to an exemplary embodiment of the present invention.

The configuration of the fixing device 90 in the present exemplary embodiment will be described with reference to the perspective diagram of FIG. 3. As shown in FIG. 3, the pressurizing body 42 has a pressurizing roll 44 disposed such that an axial direction of the pressurizing roll 44 is the same as an axial direction of the transfer cylinder 50, and a pair of sprockets 48 are provided on both ends of the pressurizing roll 44 in the axial direction. The pair of sprockets 48 are disposed coaxially with the pressurizing roll 44, and are configured to rotate integrally with the pressurizing roll 44. The chains 34 described above are wound around the pair of sprockets 48.

As shown in FIG. 1, the heating roll 92 and the pressurizing roll 44 are disposed side by side in the vertical direction. That is, the heating roll 92 is disposed on the upper side of the pressurizing roll 44. The heating roll 92 has a heating source 90A (see FIG. 1) such as a halogen lamp inside. In the following, the position where the recording medium P is interposed between the heating roll 92 and the pressurizing roll 44 is referred to as a nipping position NP.

The heating roll 92 is configured to be movable between a contact position that comes into contact with the pressurizing roll 44 and a separation position that is separated from the pressurizing roll 44 by a fixing movement mechanism (not shown) using a cam or the like. Specifically, the heating roll 92 is, for example, always pressed or pulled to the contact position by an elastic force of an elastic member such as a spring, and is configured to move to the separation position against the elastic force by the fixing movement mechanism. The heating roll 92 is configured to nip the recording medium P with the pressurizing roll 44 at the contact position.

In the present exemplary embodiment, the heating roll 92 is rotationally driven and the pressurizing roll 44 is driven to rotate, but both the heating roll 92 and the pressurizing roll 44 may be rotationally driven. Further, a recess 46 for accommodating the gripper 36 and the support member 38, which will be described later, is formed on a part of the outer circumferential surface of the pressurizing roll 44.

Transport Unit 14

As shown in FIGS. 1 to 3, the transport unit 14 has a function of transporting the recording medium P and passing the recording medium P through the nipping region T and the nipping position NP. The transport unit 14 has a pair of chains 34 and a gripper 36. The pair of chains 34 are an example of a driving force transmission member, and the gripper 36 is an example of a grasping portion that holds a tip portion of the recording medium P. In FIG. 1, the chains 34 and the gripper 36 are shown in a simplified manner. In this way, the transport unit 14 transports the recording medium P in a state where the tip of the recording medium P is grasped by the gripper 36 which is a grasping portion.

As shown in FIG. 1, the pair of chains 34 are each formed in an annular shape. Then, as shown in FIGS. 2 and 3, the pair of chains 34 are disposed at an interval in a depth direction of the apparatus. That is, the pair of chains 34 are wound around a pair of sprockets 32 coaxially provided on the transfer cylinder 50 and a pair of sprockets 48 coaxially provided on the pressurizing roll 44, respectively.

In a case where the transfer cylinder 50 is rotationally driven by a drive unit (not shown), the pair of sprockets 32 are also integrally rotationally driven in a rotation direction B (arrow B direction), such that the chains 34 circumferentially move in a circumferential direction C (arrow C direction). Further, the pressurizing roll 44 is driven and rotated as a result. That is, a rotational driving force of the transfer cylinder 50 is transmitted to the pressurizing roll 44 by the pair of chains 34 that circumferentially move in the circumferential direction C (see FIG. 1).

Further, as shown in FIGS. 2 and 3, the support member 38 to which the gripper 36 is attached is bridged to the pair of chains 34 along the depth direction of the apparatus. In the present exemplary embodiment, three support members 38 are provided in the pair of chains 34, and each support member 38 is fixed to the pair of chains 34 at a predetermined interval along the circumferential direction (circumferential direction C) of the chain 34.

Further, a plurality of grippers 36 are attached side by side to each support member 38 at predetermined intervals along the depth direction of the apparatus. That is, each gripper 36 is attached to the chain 34 via each support member 38. Each gripper 36 has a holding function of holding the tip portion of the recording medium P.

Figure 4:
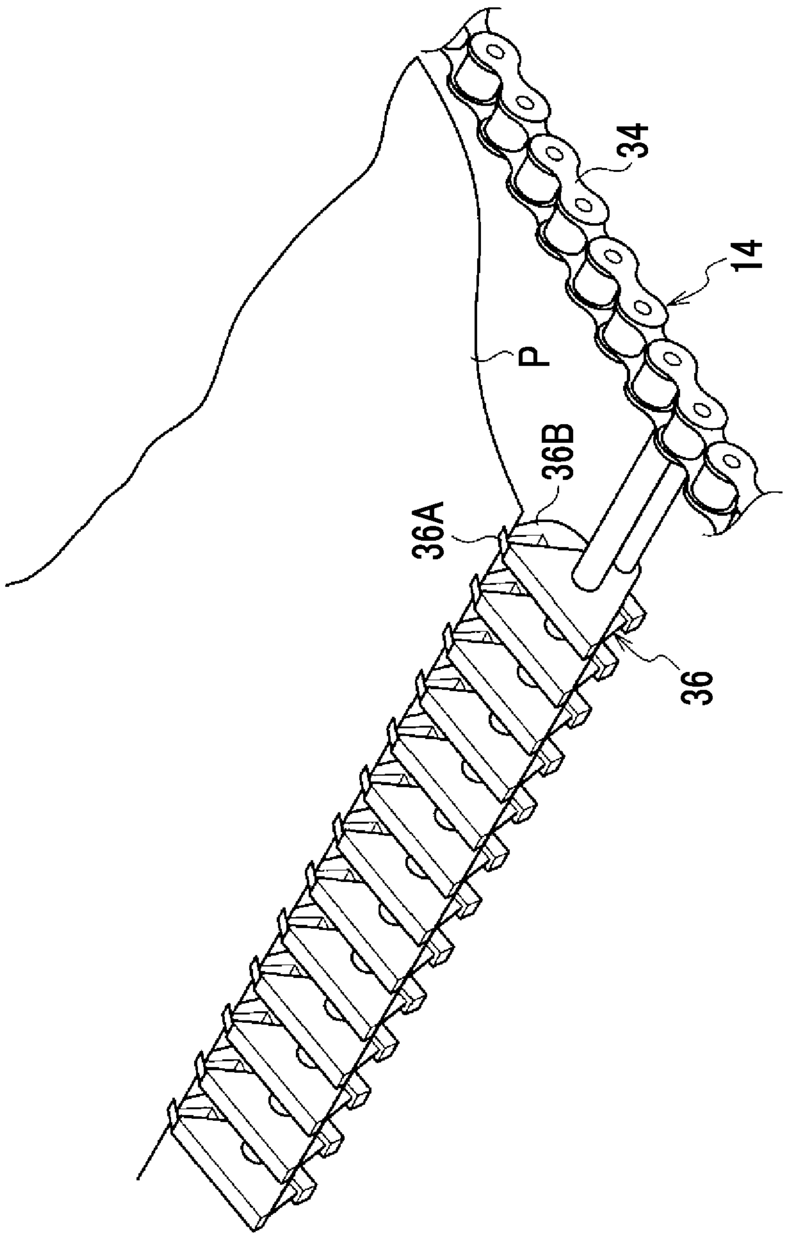
FIG. 4 is a perspective diagram showing a gripper 36 according to an exemplary embodiment of the present invention.

Specifically, as shown in FIG. 4, the gripper 36 has a plurality of claws 36A and a plurality of claw bases 36B. The gripper 36 is configured to hold the recording medium P by interposing the tip portion of the recording medium P between each claw 36A and each claw base 36B. Therefore, the gripper 36 is an example of a holding portion that holds the recording medium P in a thickness direction.

Further, the gripper 36 is configured to hold the tip portion of the recording medium P from the downstream side of the recording medium P in the transport direction. The gripper 36 is configured such that, for example, the claw 36A is pressed against the claw base 36B by a spring or the like, and the claw 36A is separated from the claw base 36B by the action of a cam or the like.

As described above, in the transport unit 14, the tip portion of the recording medium P sent from an accommodating unit (not shown) is held by the gripper 36. Then, in the transport unit 14, the chain 34 circumferentially moves in the circumferential direction C in a state where the gripper 36 holds the tip portion of the recording medium P, such that the gripper 36 is moved to transport the recording medium P, and recording medium P passes through the nipping region T together with the gripper 36 while the recording medium P is held by the gripper 36.

The pair of chains 34 are composed of a length that is an integral multiple of the outer circumferences of the sprocket 32 in the transfer body 40 and the sprocket 48 in the pressurizing body 42, respectively. The three support members 38 are provided at locations on the chains 34 corresponding to the positions of the recess 54 of the transfer cylinder 50 and the recess 46 of the pressurizing roll 44, respectively. Therefore, in a case where the gripper 36 reaches the transfer cylinder 50 when moving along with the rotation of the chain 34, the gripper 36 moves integrally with the transfer cylinder 50 in a state of being accommodated in the recess 54 of the transfer cylinder 50. Similarly, in a case where the gripper 36 reaches the pressurizing roll 44 when moving along with the rotation of the chain 34, the gripper 36 moves integrally with the pressurizing roll 44 in a state of being accommodated in the recess 46 of the pressurizing roll 44.

Here, the transport unit 14 in the present exemplary embodiment is configured to transport the recording medium P toward the nipping position NP while the gripper 36 holds the tip portion of the recording medium P in a state where the heating roll 92 is located at a separation position. The transport unit 14 is configured to release the holding of the tip portion of the recording medium P in a case where the recording medium P is transported to the nipping position NP.

That is, the transport unit 14 is configured to release the holding of the tip portion of the recording medium P after the gripper 36 passes through the nipping position NP. At this time, the pressurizing roll 44 is configured to maintain a rotated state, in other words, a state in which the chain 34 circumferentially moves.

Further, the fact that the recording medium P is transported to the nipping position NP is detected by the time after detecting the tip of the recording medium P, for example, by a detection unit provided on the upstream side of the nipping position NP in the transport direction detects it. The detection target of the detection unit may be the support member 38 or the gripper 36 other than the tip of the recording medium P.

Further, the heating roll 92 is configured to start moving from the separation position to the contact position after the gripper 36 passes through the nipping position NP and after the holding of the tip portion of the recording medium P by the gripper 36 is released, and nip the recording medium P transported to the nipping position NP with the pressurizing roll 44 therebetween. The heating roll 92 is configured to start rotating and transport the recording medium P in a state where the recording medium P is interposed between the heating roll 92 and the pressurizing roll 44.

The heating roll 92 may start moving from the separation position to the contact position before the holding of the tip portion of the recording medium P by the gripper 36 is released, and it may be configured such that the interposing the recording medium P between the heating roll 92 and the pressurizing roll 44 is completed after the holding of the tip portion of the recording medium P by the gripper 36 is released.

As described above, in the fixing device 90, it is configured such that the ink image transferred to the recording medium P is fixed to the recording medium P by heating and pressurizing the recording medium P while transporting the recording medium P with the recording medium P interposed between the heating roll 92 and the pressurizing roll 44.

Transfer Cylinder 50

Next, the transfer cylinder 50 will be described. A perspective diagram of the transfer cylinder 50 is shown in FIG. 5, and a cross-sectional diagram of the transfer cylinder 50 is shown in FIG. 6.

Figure 5:
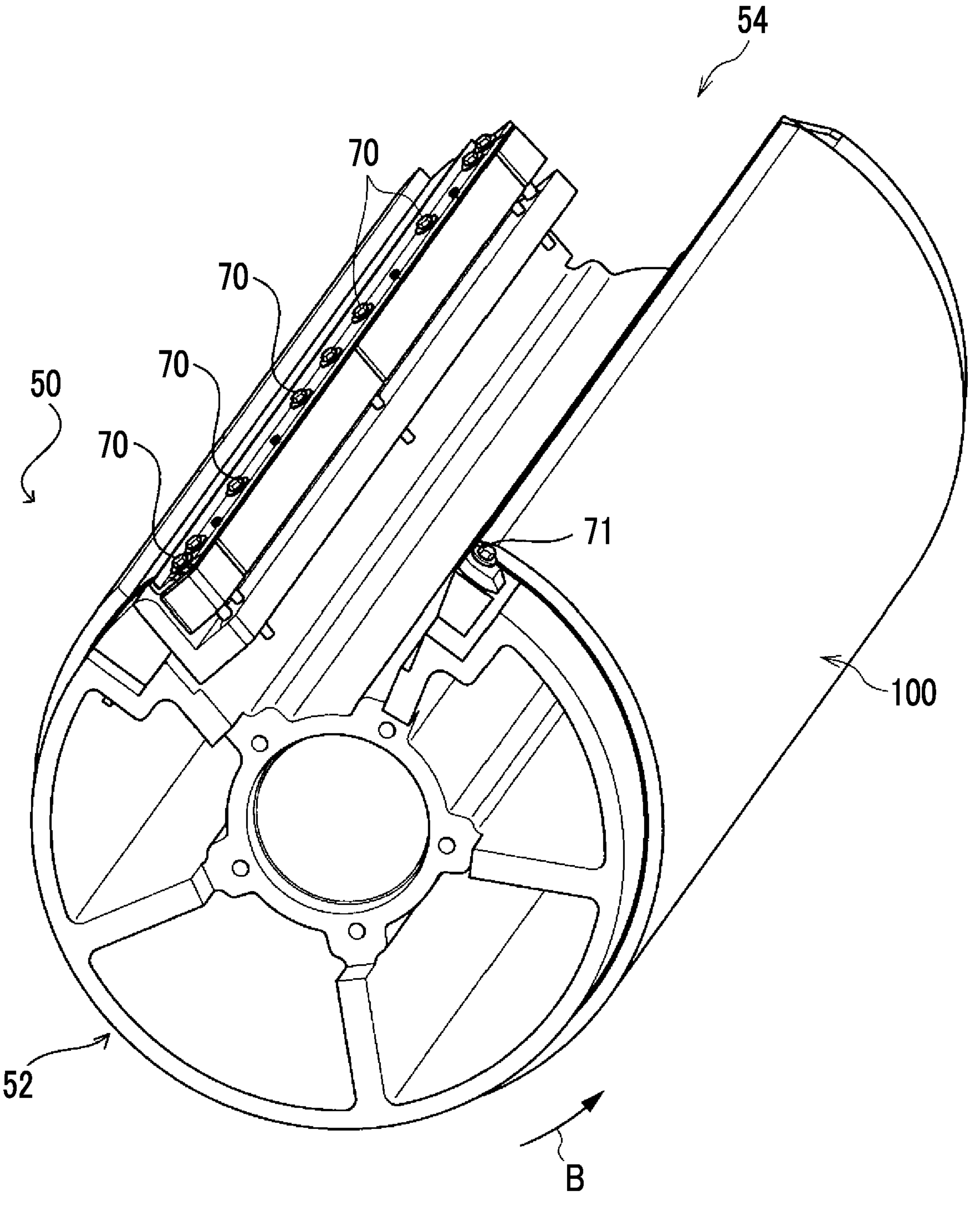
FIG. 5 is a perspective diagram of a transfer cylinder 50 according to an exemplary embodiment of the present invention.
Figure 6:
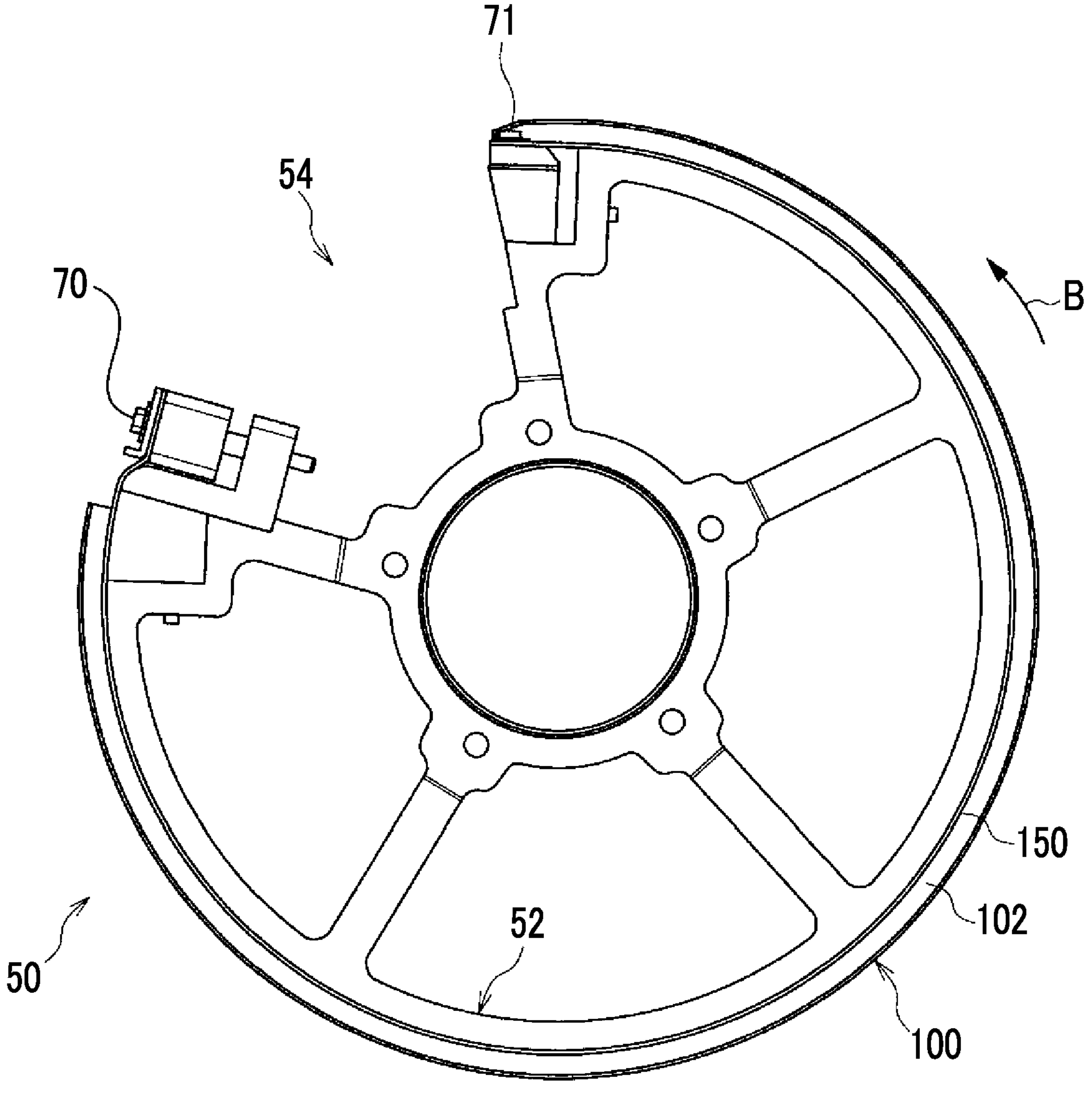
FIG. 6 is a cross-sectional diagram of a transfer cylinder 50 according to an exemplary embodiment of the present invention.

As shown in FIGS. 5 and 6, the transfer cylinder 50 as an example of a cylinder member has a cylinder main body 52 and a sheet-shaped sheet member 100 wound around the cylinder main body 52. In the following, an axial direction, a radial direction, and a circumferential direction of the cylinder main body 52 may be simply expressed as "axial direction", "radial direction", and "circumferential direction".

Further, in the following, an upstream of the transfer cylinder 50 in the rotation direction (arrow B direction) may be simply referred to as "upstream", and a downstream of the transfer cylinder 50 in the rotation direction (arrow B direction) may be simply referred to as "downstream". In a case where the circumferential direction and the axial direction are used in the description of the sheet member 100, the directions are the direction in a state where the sheet member 100 is wound around the cylinder main body 52. Further, a direction along a short side of the rectangular sheet member 100 in a plan diagram is defined as a width direction, and a direction along a long side is defined as a length direction.

The cylinder main body 52 has a single recess 54 formed along the axial direction in a part of the circumferential direction, and has a substantially circular cross section, specifically, an outer shape of the cross section orthogonal to the axial direction. The recess 54 as an example of the concave portion has a depth along a radial direction of the cylinder main body 52. Further, the cylinder main body 52 is made of a metal material such as stainless steel and aluminum. In the present exemplary embodiment, the depth direction of the recess 54 matches the radial direction. However, it is not necessary that the depth direction and the radial direction match. The depth direction may be inclined, for example, about 5° to 10° with respect to the radial direction.

The cylinder main body 52 is formed such that a length along the axial direction is longer than a width along the axial direction of the sheet member 100, and the sheet member 100 is wound in a state where a central portion of the sheet member 100 in the width direction matches a central portion of the cylinder main body 52 in the axial direction. The sheet member 100 has a width larger than a maximum width of the recording medium P (see FIG. 4).

The "sheet shape" means a shape such as paper and a thin plate having a thickness that can be deformed along an outer circumference of the cylinder main body 52. The length of the sheet member 100 in the circumferential direction (length direction) is configured to be substantially the same as the length of the cylinder main body 52 in the circumferential direction excluding the recess 54.

As shown in FIG. 6, the sheet member 100 has a metal layer 150 that is wound in contact with the outer circumferential surface of the cylinder main body 52, and an outer layer 102 that is laminated and adhered to the outer circumferential surface of the metal layer 150.

As the metal layer 150 of the present exemplary embodiment, a metal material such as stainless steel, aluminum, and copper is used. The thickness of the metal layer 150 in the present exemplary embodiment is, for example, 0.1 mm.

For the outer layer 102 of the present exemplary embodiment, a conductive resin material such as solid rubbers such as nitrile rubber, chloroprene rubber, ethylene propylene diene rubber, acrylic nitrile butadiene rubber, and silicon rubber, polyimide, polyamide imide, polyurethane, polyethylene, and mixtures thereof are used. The thickness of the outer layer 102 in the present exemplary embodiment is thicker than the thickness of the metal layer 150, for example, 7.0 mm.

In the present exemplary embodiment, one end of the sheet member 100 is fixed to the cylinder main body 52 by a mounting screw 71, and the other end is fixed to the cylinder main body 52 by a fixing screw 70. Therefore, the sheet member 100 is easily attached to and detached from the cylinder main body 52.

Figure 7:
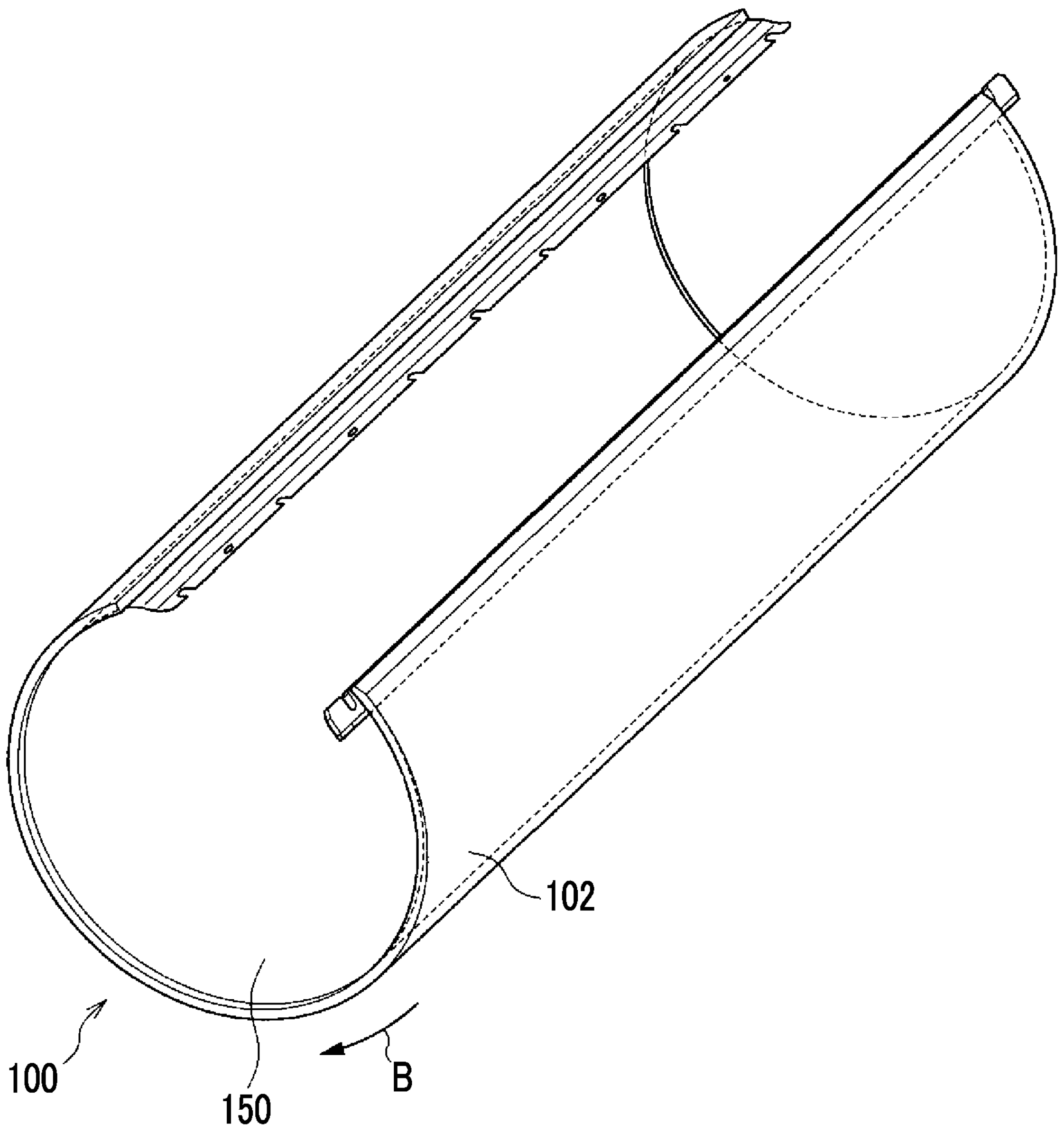
FIG. 7 is a perspective diagram of a sheet member 100 according to an exemplary embodiment of the present invention.
Figure 8:
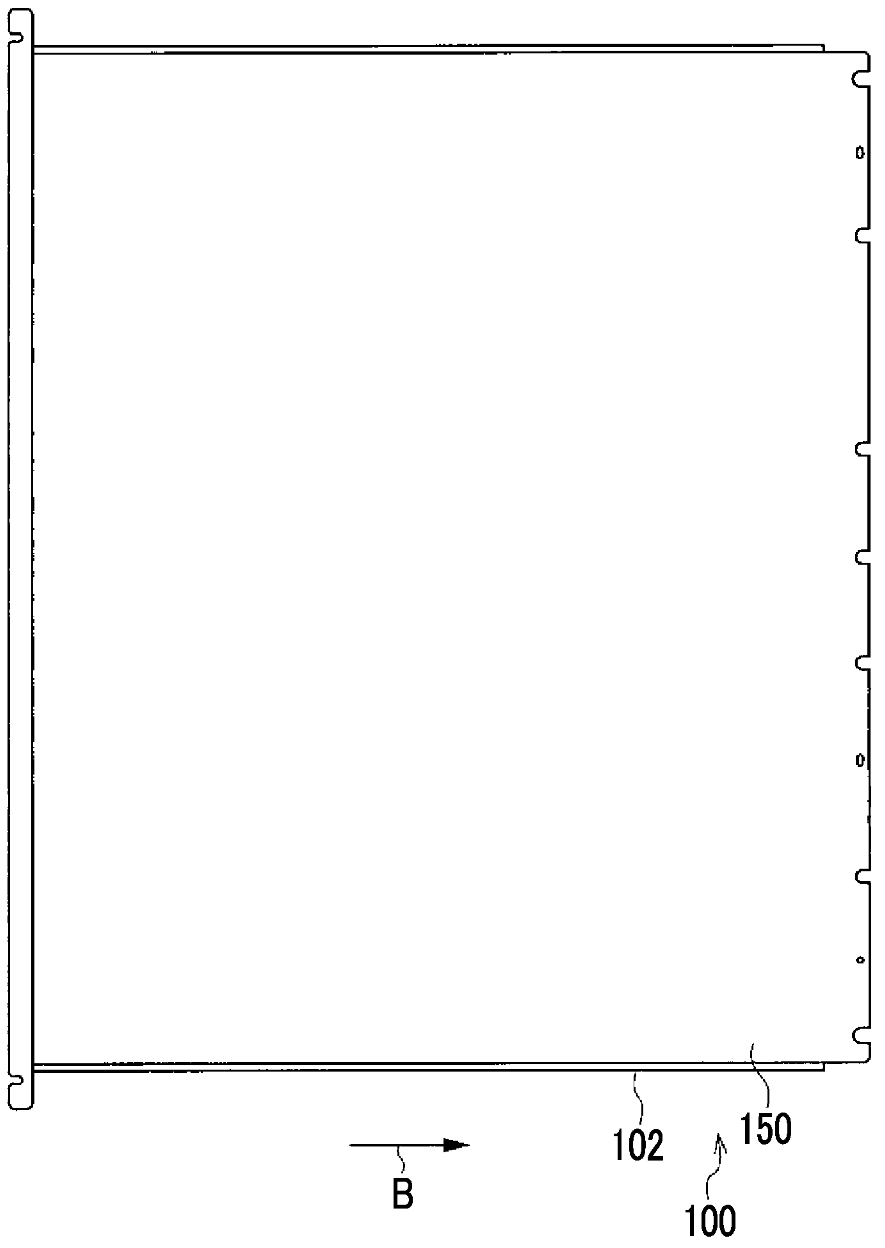
FIG. 8 is a plan diagram of a sheet member 100 according to an exemplary embodiment of the present invention as viewed from a metal layer 150 side.

FIG. 7 shows a perspective diagram of the sheet member 100 in a state of being removed from the cylinder main body 52. Further, FIG. 8 shows a plan diagram of the sheet member 100 according to the present exemplary embodiment as viewed from the metal layer 150 side.

Figure 9:
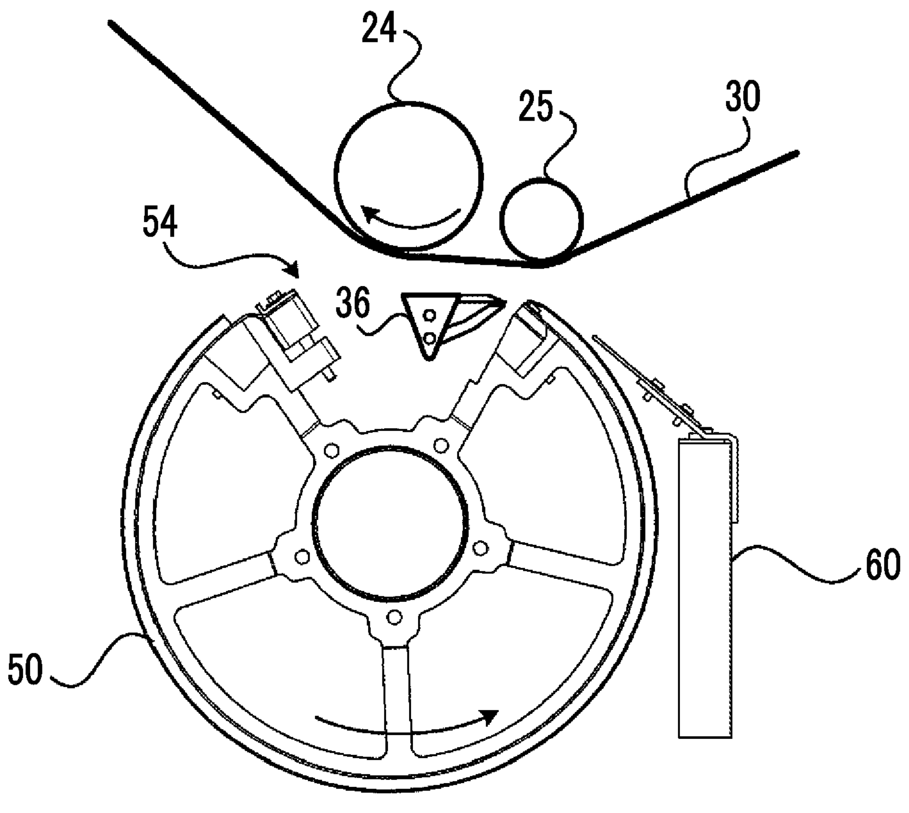
FIG. 9 is an enlarged peripheral diagram of a transfer position at which an image on a transfer belt 30 is transferred to a recording medium P.

Next, FIG. 9 shows an enlarged peripheral diagram of the transfer position where the transfer cylinder 50 and the opposing roll 24 are close to each other and the image on the transfer belt 30 is transferred to the recording medium P.

FIG. 9 shows how the transfer cylinder 50 rotates with the gripper 36 accommodated in the recess 54. Then, it can be seen that the sliding member 60 is disposed close to the transfer cylinder 50 on the downstream side of the transfer position in the rotation direction.

Figure 10:
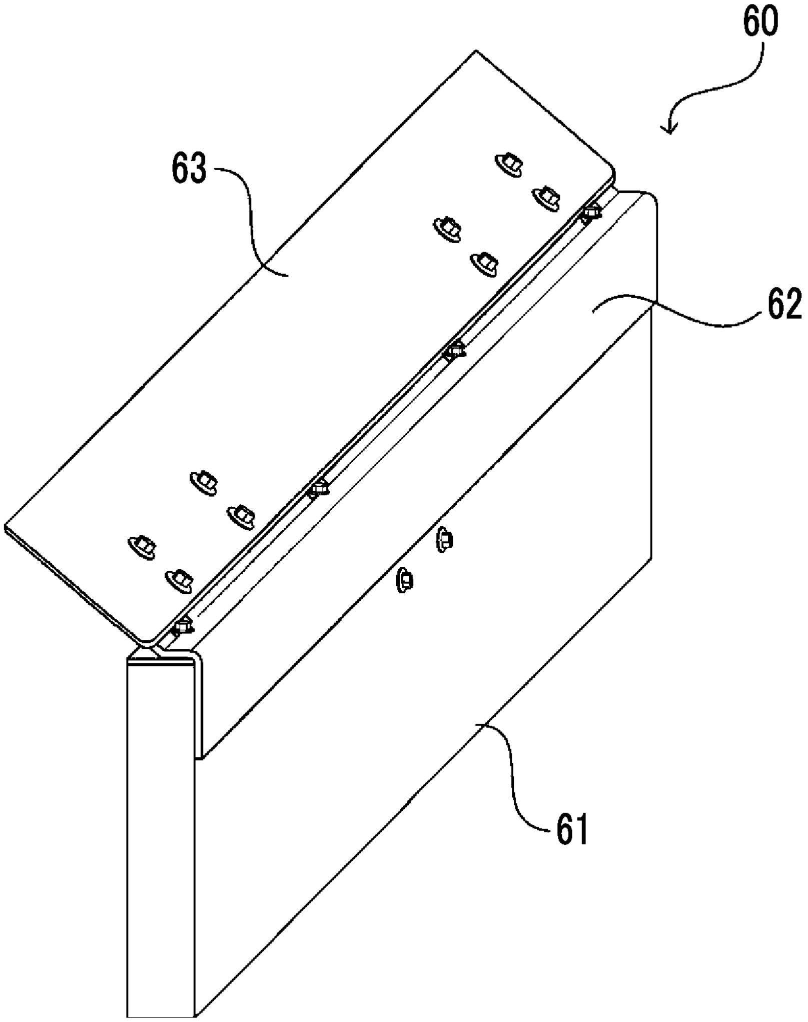
FIG. 10 is a perspective diagram of a sliding member 60 shown in FIG. 9.

A perspective diagram of the sliding member 60 is shown in FIG. 10. Referring to FIG. 10, the sliding member 60 is composed of a main body portion 61, a fixing metal fitting 62, and a plate-shaped portion 63. The plate-shaped portion 63 is a member for imparting a transport load to the recording medium P by coming into contact with the transported recording medium P, and is fixed to the fixing metal fitting 62 by, for example, screwing. Then, the fixing metal fitting 62 is fixed to the main body portion 61 by screwing or the like, such that the plate-shaped portion 63 is fixed to the main body portion 61 via the fixing metal fitting 62.

The plate-shaped portion 63 is a member that comes into direct contact with the transported recording medium P, and is made of, for example, a material such as rubber having a friction coefficient between the plate-shaped portion 63 and the recording medium P of 1.0 or more and 1.5 or less. The material configuring the plate-shaped portion 63 is not limited to rubber, and other materials such as a resin material and a metal material can also be used.

Next, the reason for imparting the transport load to the recording medium P being transported by the sliding member 60 as described above will be described.

Figure 11:
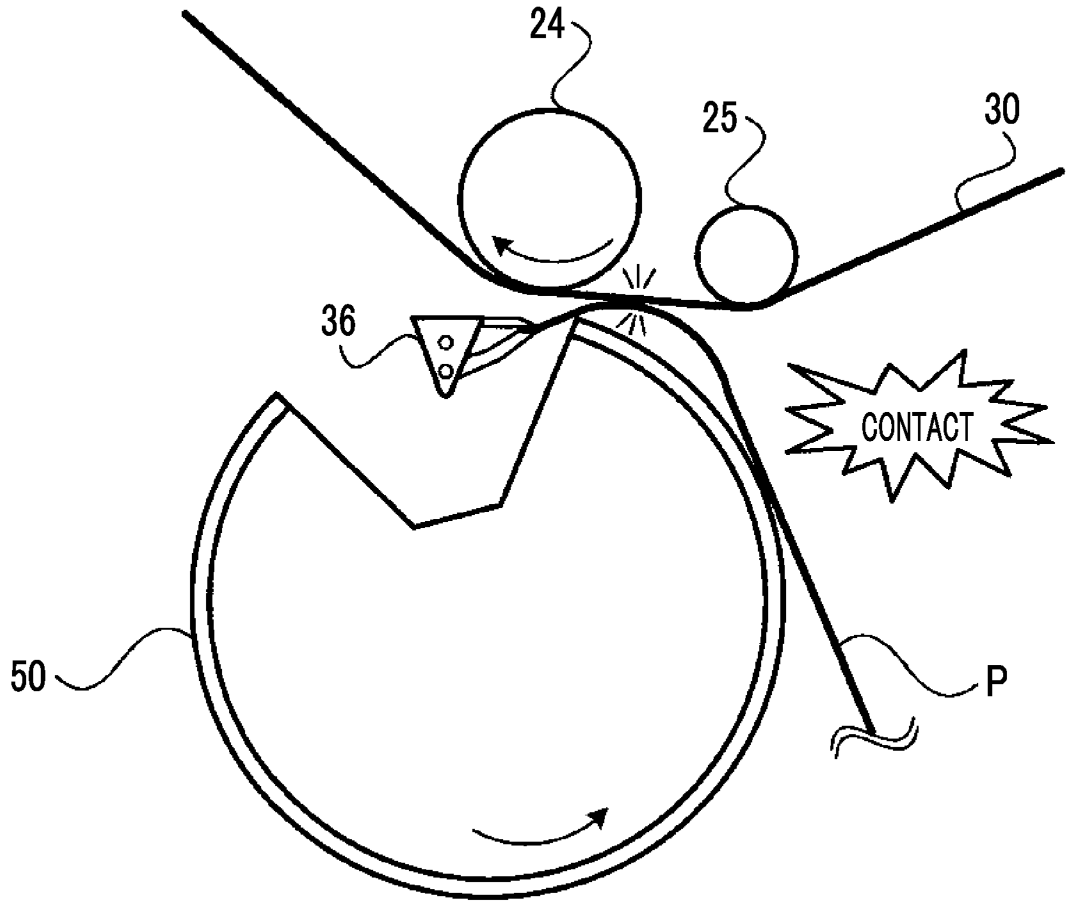
FIG. 11 is a diagram showing an example of a state of a recording medium P in a case where there is no sliding member 60.

First, FIG. 11 shows an example of a state of the recording medium P in a case where the sliding member 60 is not present. In FIG. 11, the outer shapes of the sliding member 60, the transfer cylinder 50, and the like are shown schematically in a simplified manner. In FIG. 11, it can be seen that the recording medium P grasped by the gripper 36 is lifted by the transfer cylinder 50, floating is generated, and the recording medium P comes into contact with the transfer belt 30 before the image of the transfer belt 30 is transferred to the recording medium P at an original transfer position. In a case where such a state occurs, transfer deviation occurs in the image transferred on the recording medium P, and an image quality deteriorates. Specifically, as an example, image deterioration occurs in which lines in the image are blurred and thickened and a line width is widened.

Figure 12:
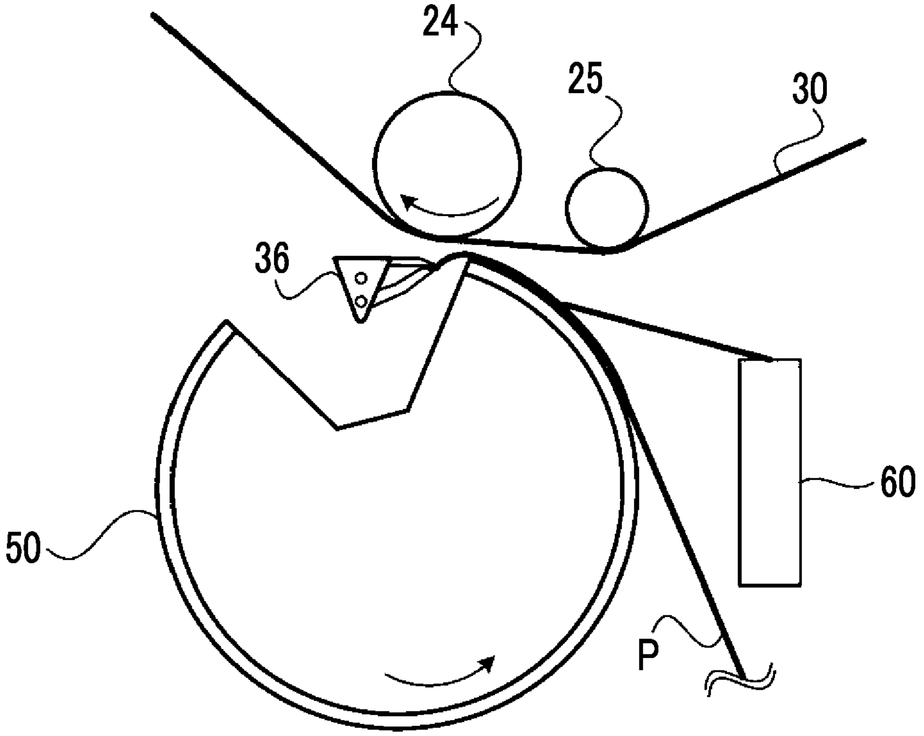
FIG. 12 is a diagram showing an example of a state of a recording medium P in a case where a sliding member 60 is present.

Next, FIG. 12 shows an example of a state of the recording medium P in a case where the sliding member 60 is present. Referring to FIG. 12, it can be seen that the recording medium P grasped by the gripper 36 and the sliding member 60 slide, such that the recording medium P is pulled to the downstream side in the transport direction and the floating of the recording medium P is suppressed. In particular, in the image forming apparatus 10 of the present exemplary embodiment, since the tip of the recording medium P is transported while being grasped by the gripper 36, the effect of suppressing floating can be remarkably obtained by pulling the recording medium P to the downstream side in the transport direction.

The sliding member 60 in the present exemplary embodiment has a plate shape, and by adjusting a distance between the tip of the sliding member 60 and the opposing roll 24 and a distance between the tip of the sliding member 60 and a surface of the transfer cylinder 50, the effect of suppressing the floating of the recording medium P changes.

Specifically, the effect of suppressing floating becomes stronger in a case where the distance between the tip of the sliding member 60 and the opposing roll 24 is shortened. However, in a case where the sliding member 60 is located too close to the opposing roll 24, there is a high possibility that the sliding member 60 will come into contact with the transfer belt 30. Further, the shorter the distance between the tip of the sliding member 60 and the surface of the transfer cylinder 50, the larger the transport resistance imparted to the recording medium P, and the transport resistance can be applied to the thin recording medium P as well.

Figure 13:
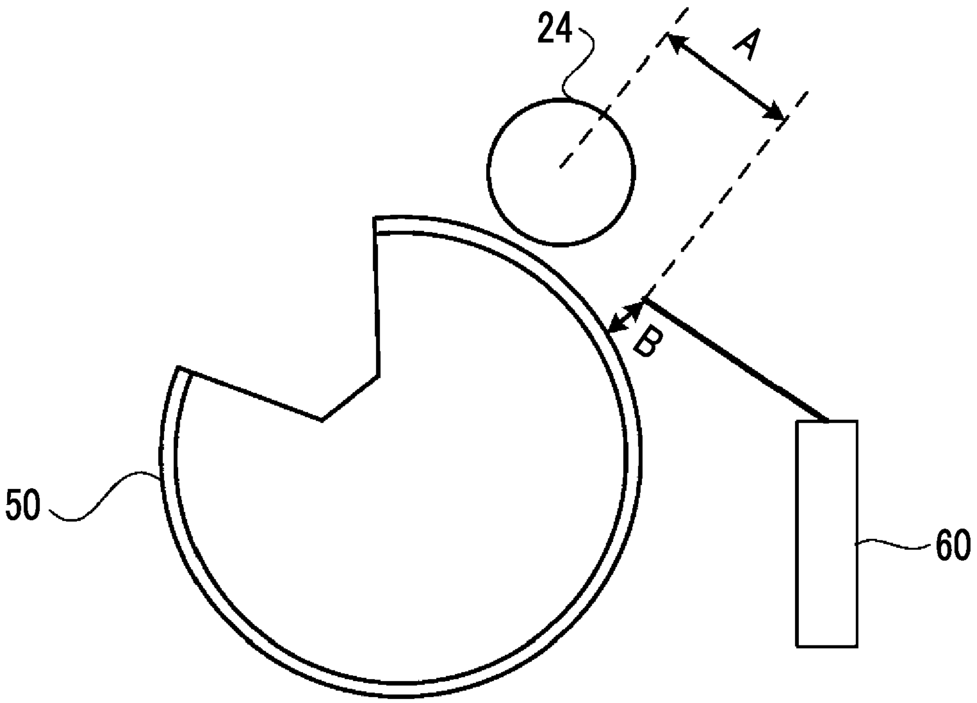
FIG. 13 is a diagram for explaining a distance A between a tip of a sliding member 60 and a center of an opposing roll 24, and a distance B between a tip of a sliding member 60 and a surface of a transfer cylinder 50.

Therefore, as shown in FIG. 13, an amount of image shift generated has been evaluated by changing a distance A between the tip of the sliding member 60 and a center of the opposing roll 24 and a distance B between the tip of the sliding member 60 and the surface of the transfer cylinder 50.

Specifically, an image of thin lines of two dots has been formed in a direction orthogonal to the transport direction of the recording medium P, and the evaluation has been performed based on how wide the width of the thin lines is. In a case where the image shift does not occur, the width of the image of thin lines remains the same, but in a case where the image shift occurs, the width of the thin line widens. Therefore, it has been evaluated whether the width of the image of thin lines is acceptable or not.

Based on the evaluation result, good evaluation result has been obtained by disposing the tip of the sliding member 60 at a position where the distance A from the center of the opposing roll 24 is 50 mm or less and the distance B from the surface of the transfer cylinder 50 is 2 mm or less.

In a case where it is desired to surely impart transport resistance to the transported recording medium P, that is, in a case where it is desired to impart transport resistance regardless of the thickness of the recording medium P to be transported, the sliding member 60 may be disposed so as to be in contact with the surface of the transfer cylinder 50. However, in such a disposition, the ink-accepting particles and the like adhering to the transfer cylinder 50 may adhere to the sliding member 60 and contaminate the transported recording medium P. Further, there is a possibility that the sliding member 60 and the transfer cylinder 50 are always in constant contact with each other and worn, such that the deterioration progresses quickly.

Therefore, considering the effects of contamination on the image transferred on the recording medium P, deterioration of the transfer cylinder 50 and the sliding member 60 due to wear, and influence of the transport resistance of the transported recording medium P, it is desirable to dispose the sliding member 60 in a non-contact manner with respect to the transfer cylinder 50.

Further, a paper having a weak waist, that is, a thin paper has a small floating from the transfer cylinder 50, and a paper having a strong waist, that is, a thick paper has a large floating from the transfer cylinder 50. Specifically, the thickness of general paper is about 0.09 mm, the thickness of thick paper is about 0.15 mm, and the thickness of particularly thick paper is 0.2 mm or more. Therefore, in a case where the paper is thin and has a weak waist, the position of the sliding member 60 may be set so as not to come into contact with the transfer cylinder 50 or to come into contact with the transfer cylinder 50 weakly. Further, in a case of plain paper, the position of the sliding member 60 may be set so as to come into contact with the transfer cylinder 50 weakly than the thick paper. In a case of the thick paper, the position of the sliding member 60 may be set such that, in a case where there is no floating, the sliding member 60 does not come into contact with the transfer cylinder 50, but in a case where there is floating, the transfer cylinder 50 comes into contact with the sliding member 60 thereby suppressing the floating. Further, in a case of special paper, the position of the sliding member 60 may be set such that the sliding member 60 can come into contact with the transfer cylinder 50 regardless of floating. The distance between the sliding member 60 and the surface of the transfer cylinder 50 is set in consideration of various conditions as described above.

In the above description, a configuration in which the transport load is imparted to the recording medium P transported by the transport unit 14, by the plate-shaped sliding member 60 has been described, but the transport load may be imparted to the recording medium P by another configuration.

Figure 14:
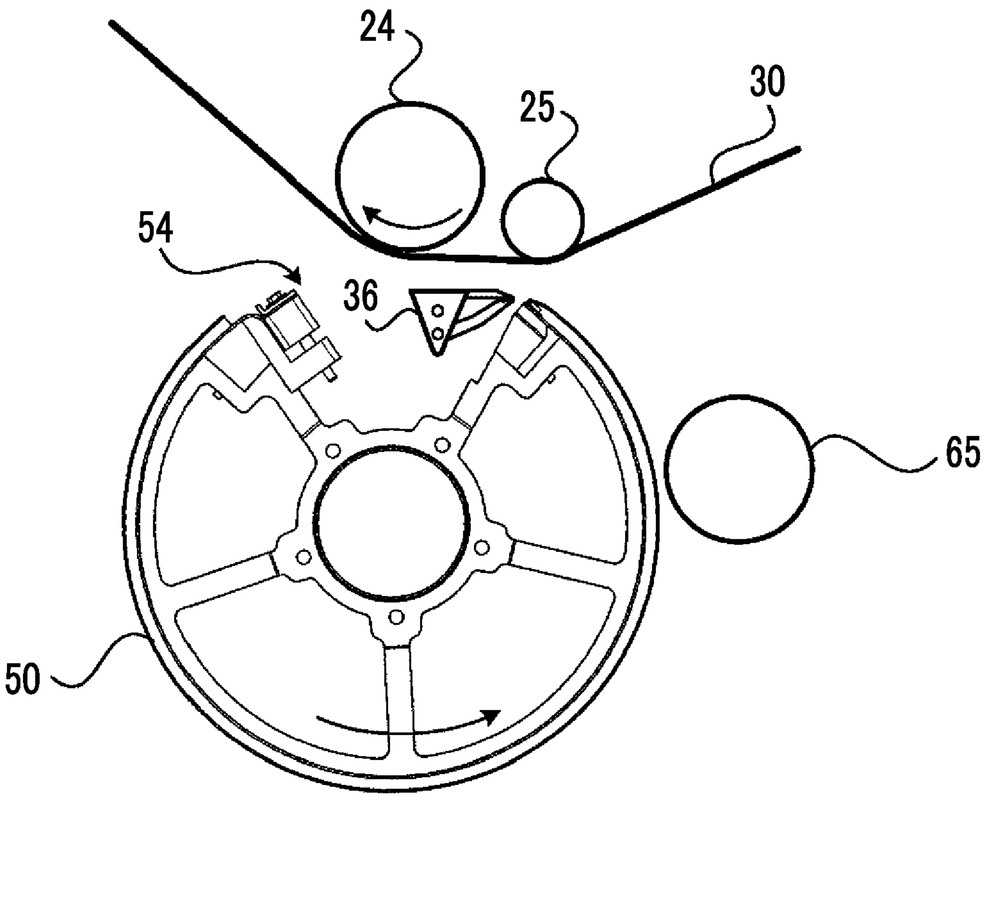
FIG. 14 is a diagram for explaining a configuration in a case where a transport load is imparted to a recording medium P by a rotary roll 65.

For example, as shown in FIG. 14, the transport load may be imparted to the recording medium P by a rotary roll 65, which is a rotating member that is disposed in close proximity without coming into contact with the surface of the transfer cylinder 50 and that rotates in contact with the transported recording medium P.

The rotary roll 65 may be a rotating member that rotates in contact with the surface of the transfer cylinder 50.

At this time, the rotary roll 65 may be a driven roll configured to rotate by a frictional force with the surface of the transfer cylinder 50 or the recording medium P, or a drive roll that is driven by a driving force from the outside.

Figure 15:
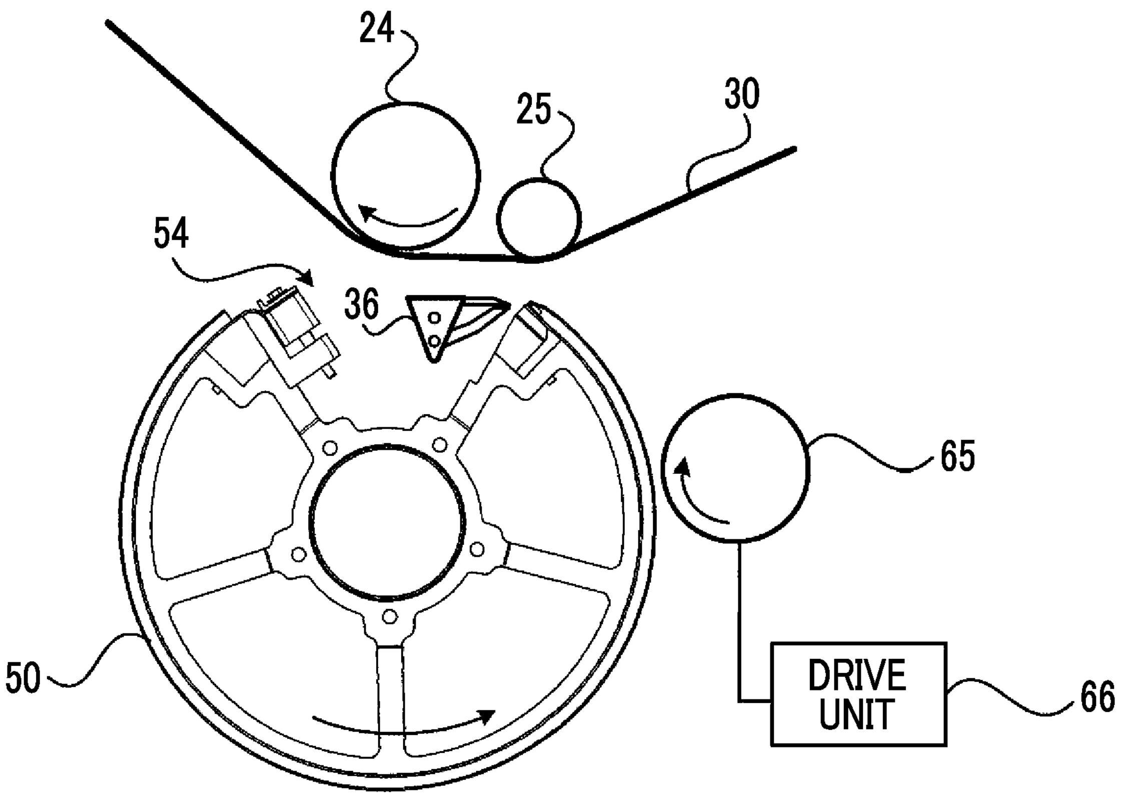
FIG. 15 is a diagram showing a configuration in a case where a rotary roll 65 is a drive roll.

FIG. 15 shows a configuration in a case where the rotary roll 65 is a drive roll. The rotary roll 65 shown in FIG. 15 is driven by a driving force of a drive unit 66. In a case where the rotary roll 65 is driven in this way, it is configured to rotate at a surface speed slower than a surface speed of the transfer cylinder 50.

Even in a case where a transport load is imparted to the recording medium P by the rotary roll 65, by adjusting the distance between the rotary roll 65 and the opposing roll 24 and the distance between the rotary roll 65 and the surface of the transfer cylinder 50, the effect of suppressing the floating of the recording medium P changes.

Figure 16:
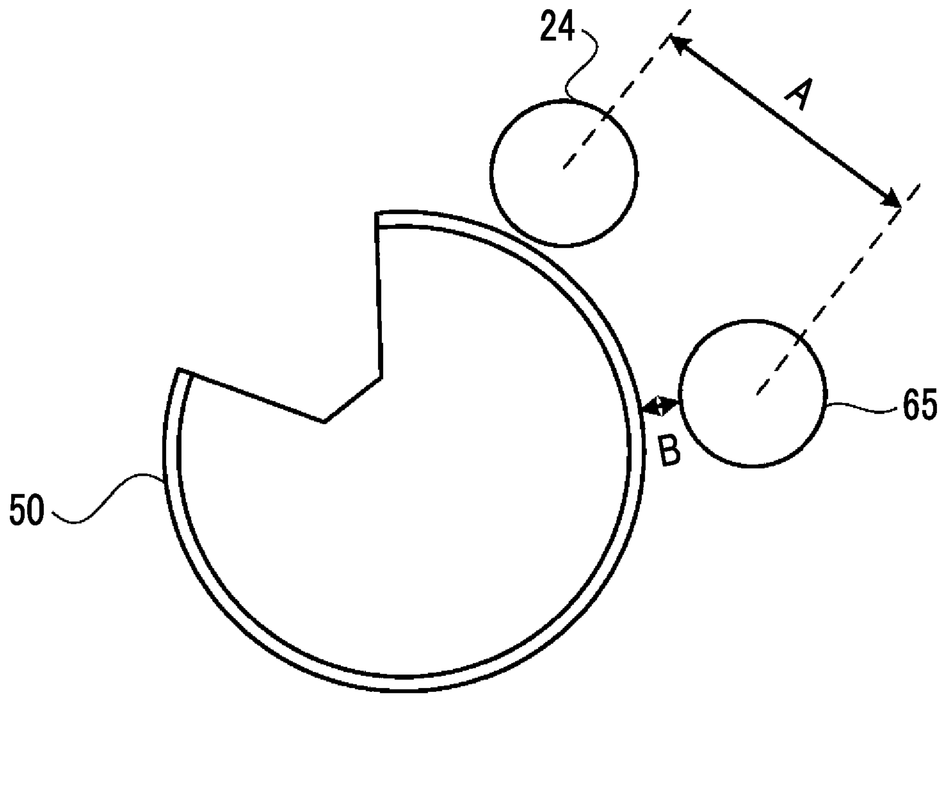
FIG. 16 is a diagram for explaining a distance A between a center of a rotary roll 65 and a center of an opposing roll 24, and a distance B between a surface of a rotary roll 65 and a surface of a transfer cylinder 50.

Therefore, as shown in FIG. 16, the amount of image shift generated has been evaluated by changing the distance A between the center of the rotary roll 65 and the center of the opposing roll 24 and the distance B between the surface of the rotary roll 65 and the surface of the transfer cylinder 50.

Based on the evaluation result, good evaluation result has been obtained by disposing the center of the rotary roll 65 such that the distance from the center of the opposing roll 24 is 50 mm or less, and the distance between the surface of the rotary roll 65 and the surface of the transfer cylinder 50 is 2 mm or less.

Similar to the sliding member 60 described above, the member configuring the rotary roll 65 can be made of, for example, a material such as rubber having a friction coefficient with the recording medium P of 1.0 or more and 1.5 or less. The material configuring the rotary roll 65 is not limited to rubber, and other materials such as a resin material and a metal material can also be used.

In the actual apparatus configuration, it may not be possible to impart a sufficient transport load as described above to the recording medium P due to various restrictions. Therefore, not only the transport load may be imparted to the recording medium P, but also the configuration as described below may be adopted to suppress the floating of the recording medium P from the transfer cylinder 50.

Figure 17:
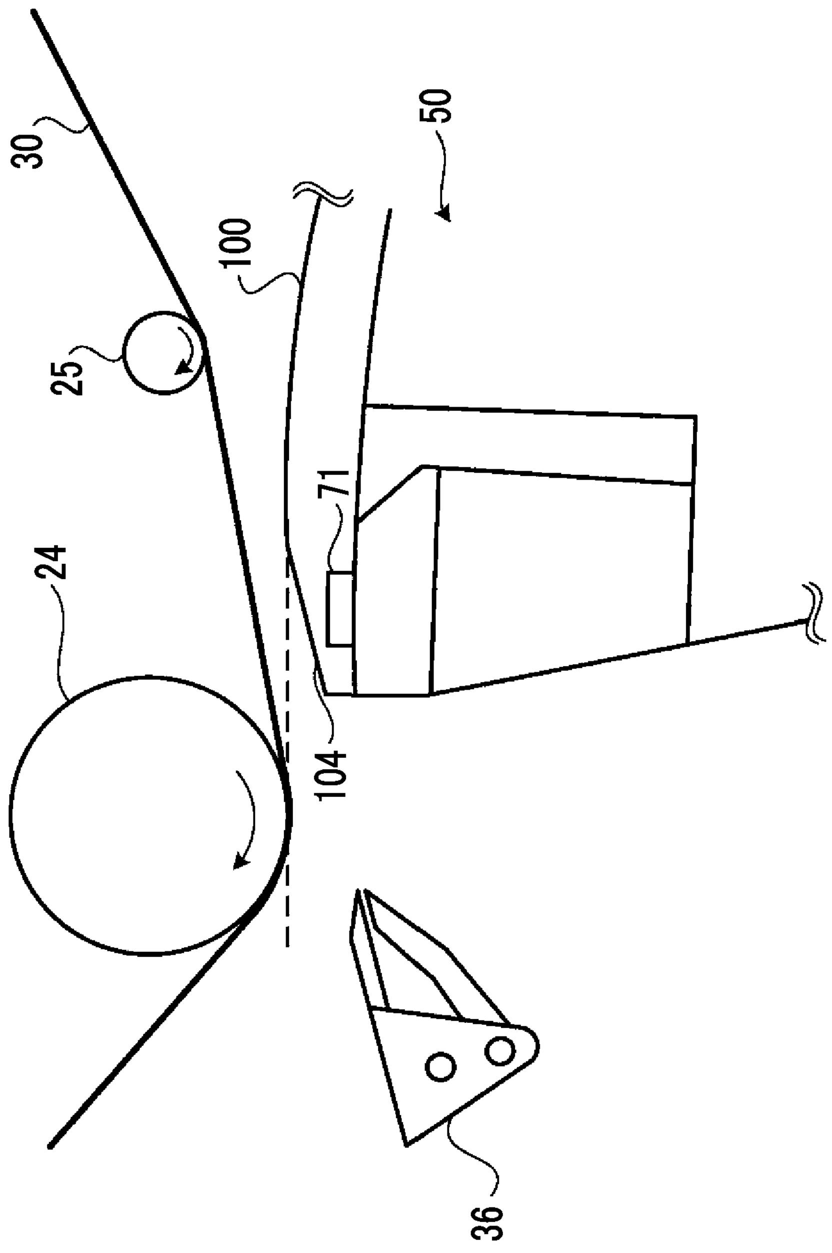
FIG. 17 is an enlarged diagram of a leading side of a transfer cylinder 50 in a rotation direction.

FIG. 17 shows an enlarged diagram of the leading side of the transfer cylinder 50 in the rotation direction. Referring to FIG. 17, at the tip of the surface in the recess 54 of the transfer cylinder 50 on the side that becomes the head in the rotation direction, a tapered surface 104, which is an inclined surface that is inclined as the distance from the rotation center to the surface increases toward the downstream side in the rotation direction, is provided. As described above, the transfer cylinder 50 is composed of the cylinder main body 52 in which the recess 54 is provided in a direction substantially orthogonal to the rotation direction and the sheet member 100 wound around the cylinder main body 52, and thus the tapered surface 104 is provided at the tip of the sheet member 100 on the side that becomes the head in the rotation direction.

Figure 18:
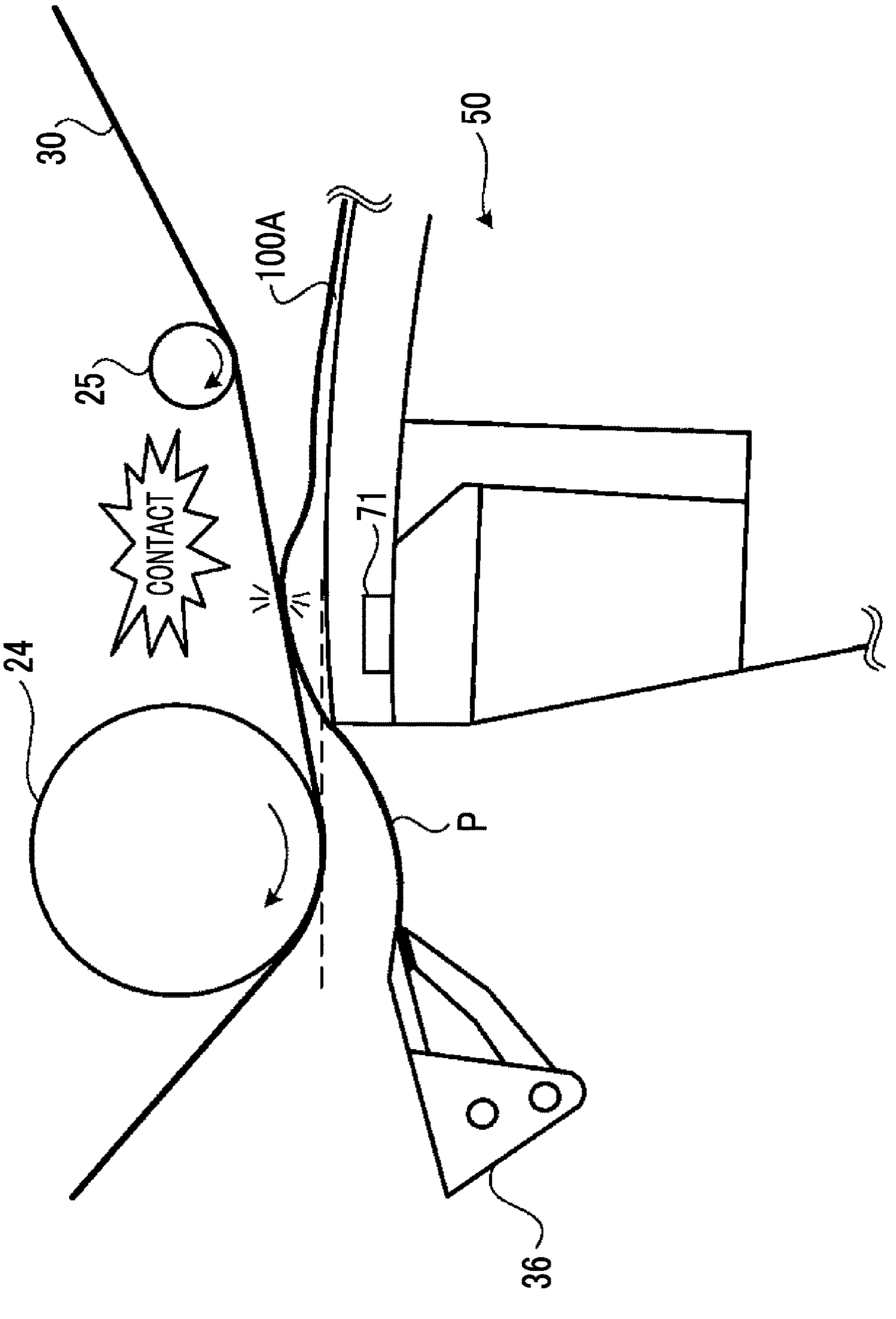
FIG. 18 is a diagram showing an example of a state of a recording medium P in a case where a sheet member 100A that it not provided with tapered surface 104 is used.

Since the sheet member 100 is provided with the tapered surface 104 as described above, the recording medium P is suppressed from floating from the transfer cylinder 50. FIG. 18 shows an example of the state of the recording medium P in a case where a sheet member 100A that is not provided with the tapered surface 104 is used.

Referring to FIG. 18, it can be seen that the recording medium P grasped by the gripper 36 is pushed up to the tip of the sheet member 100A to cause floating, and comes into contact with the transfer belt 30 before a normal transfer position.

Figure 19:
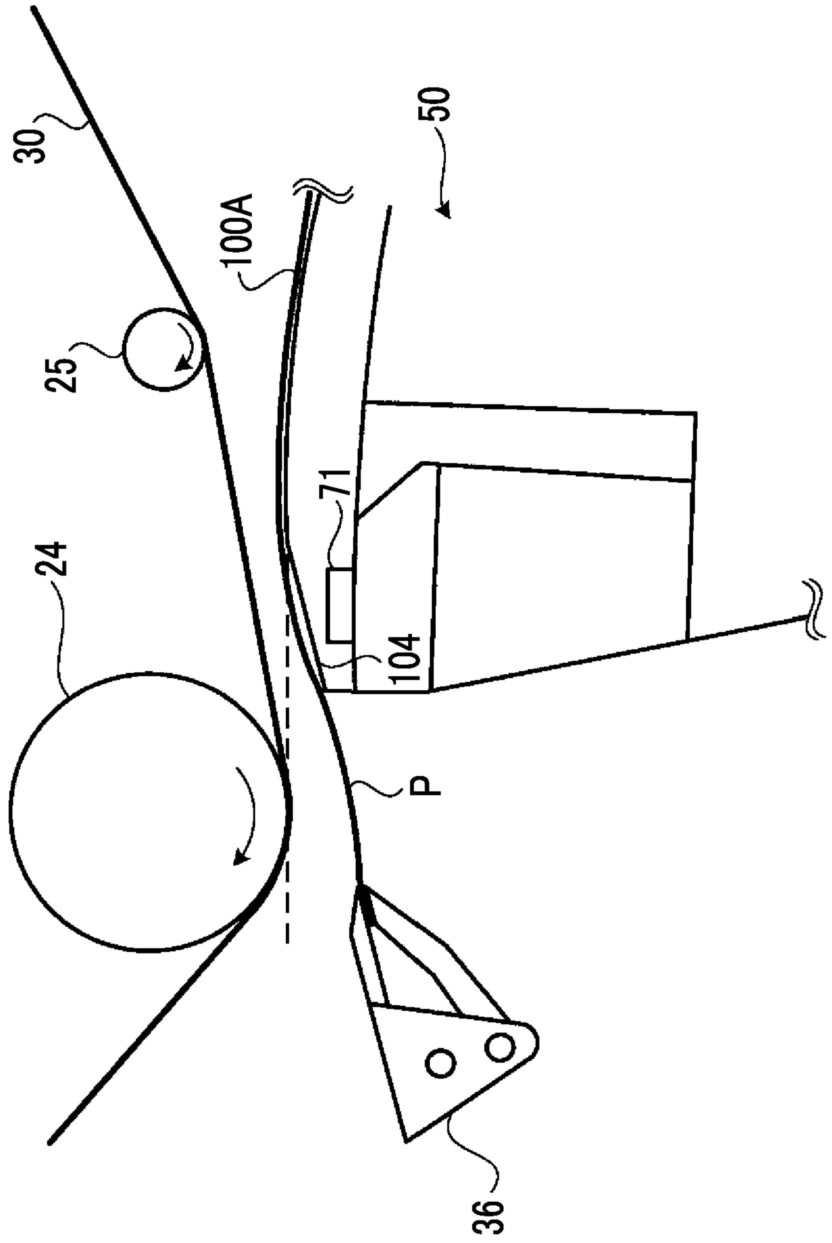
FIG. 19 is a diagram showing an example of a state of a recording medium P in a case where a sheet member 100 provided with a tapered surface 104 is used.

On the other hand, FIG. 19 shows an example of a state of the recording medium P in a case where the sheet member 100 provided with the tapered surface 104 is used.

Referring to FIG. 19, the recording medium P grasped by the gripper 36 is not pushed up to the tip of the sheet member 100, the occurrence of floating is suppressed, and the occurrence of a situation in which the recording medium P comes into contact with the transfer belt 30 at an unintended position is prevented.

It is more desirable that the position of the gripper 36, an orientation of a grasping surface on which the gripper 36 grasps the recording medium P, and an inclination angle of the tapered surface 104 provided on the sheet member 100 satisfy a specific condition.

Figure 20:
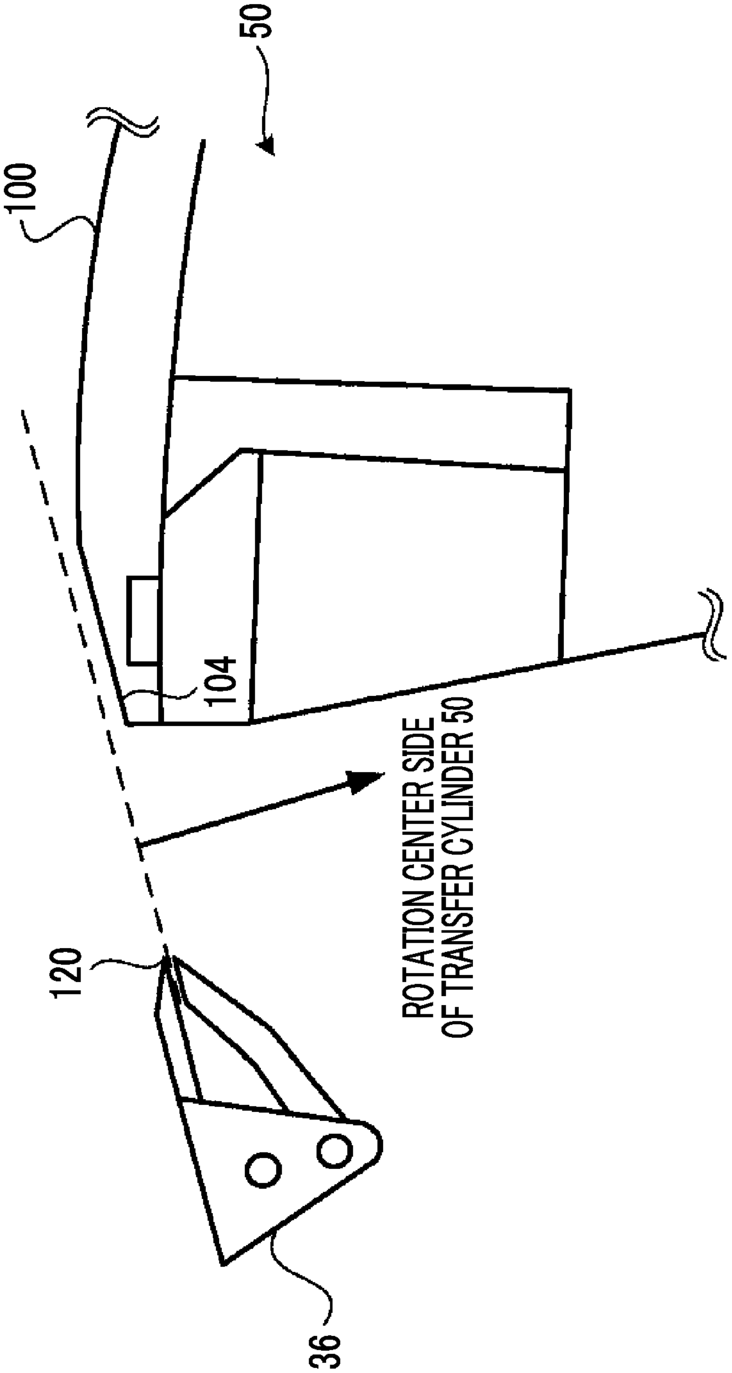
FIG. 20 is a diagram for explaining a relationship between a tapered surface 104 and a grasping surface 120 on which a gripper 36 grasps a recording medium P.

Specifically, as shown in FIG. 20, it may be configured such that the tapered surface 104 is on a rotation center side of the transfer cylinder 50 with respect to a surface including the grasping surface 120 on which the gripper 36 grasps the recording medium P in a state where the gripper 36 is accommodated in the recess 54.

Figure 21:
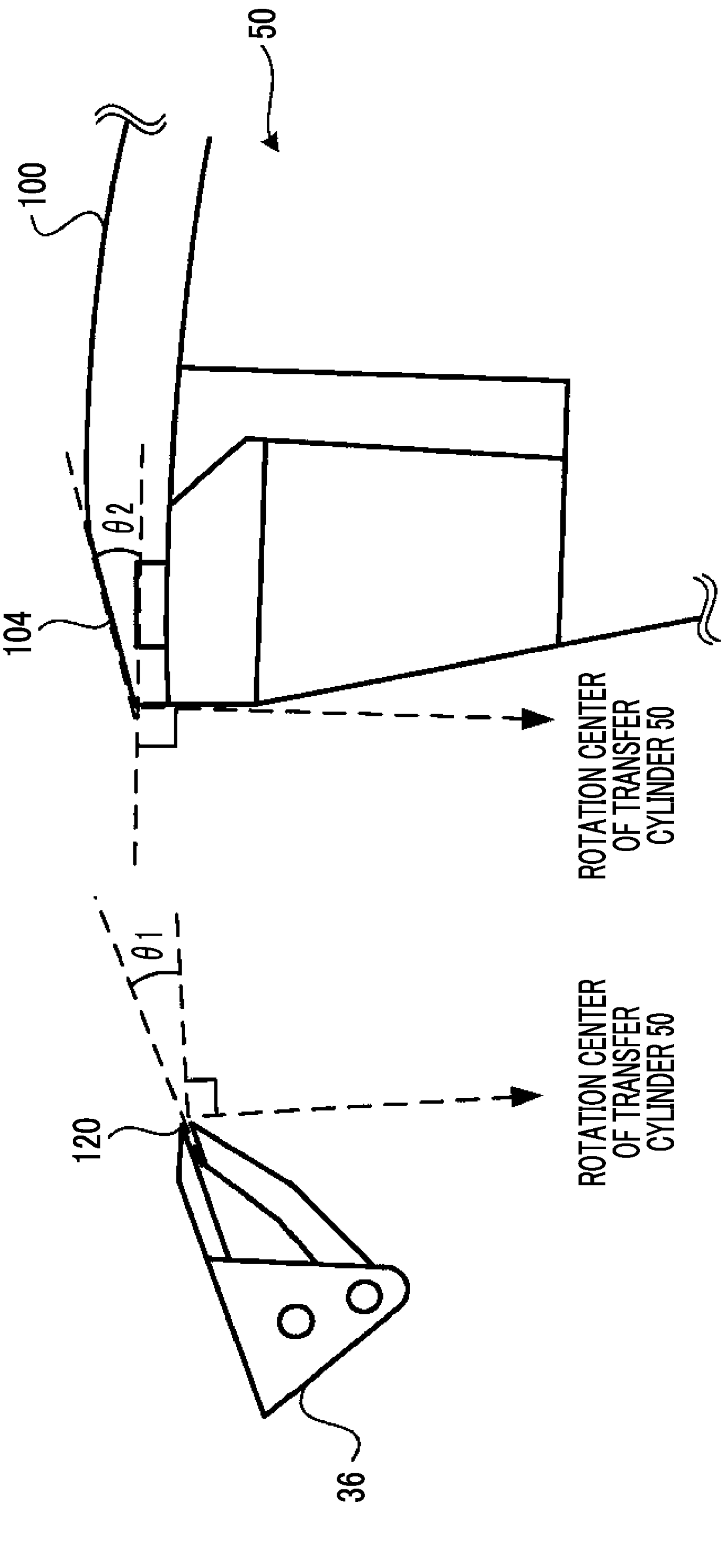
FIG. 21 is a diagram for explaining a relationship between an angle θ1 between a grasping surface 120 on which a gripper 36 grasps a recording medium P and a plane orthogonal to a tip position of the gripper 36 on a line in a rotation center direction of a transfer cylinder 50 from the tip position of the gripper 36, and an angle θ2 between a tapered surface 104 and a plane orthogonal to a tip position of the tapered surface 104 on the line in the rotation center direction of the transfer cylinder 50 from the tip position of the tapered surface 104.

Further, as shown in FIG. 21, it may be configured such that an angle $\theta 2$ between a tapered surface 104 and a plane orthogonal to a tip position of the tapered surface 104 on the line in the rotation center direction of the transfer cylinder 50 from the tip position of the tapered surface 104 is smaller than an angle $\theta 1$ between a grasping surface 120 on which a gripper 36 grasps a recording medium P and a plane orthogonal to a tip position of the gripper 36 on a line in a rotation center direction of a transfer cylinder 50 from the tip position of the gripper 36. That is, since it is configured such that $\theta 2 < \theta 1$, there is a high possibility that the recording medium P grasped by the gripper 36 is on the tapered surface 104. As a result, the occurrence of a situation in which the recording medium P is pushed up by the transfer cylinder 50 is prevented, and the floating of the recording medium P from the transfer cylinder 50 is suppressed.

Further, for example, it is more preferable that it is configured such that the distance between the tip of the sheet member 100 on the side that becomes the head in the rotation direction and the tip of the region of the gripper 36 for grasping the recording medium P is 3 mm or more. However, in a case where the gripper 36 is disposed at a position far from the tip of the transfer cylinder 50, a tip margin region where an image is not formed from the beginning of the recording medium P increases, such that the position where the gripper 36 is separated from the transfer cylinder 50 is limited.

Further, by providing the tapered surface 104 on the sheet member 100, the effect of alleviating an impact when the opposing roll 24 comes into contact with the transfer cylinder 50 at the transfer position can be obtained. However, in a case where the inclination of the tapered surface 104 provided on the sheet member 100 is made gentle and the distance is lengthened, since the tip margin region where an image is not formed from the beginning of the recording medium P increases, the distance and inclination of the tapered surface 104 are limited.

Therefore, by combining a configuration in which a transport load is imparted to the recording medium P by the sliding member 60 or the like described above and a configuration in which the tapered surface 104 is provided at the tip of the sheet member 100, the floating of the recording medium P from the transfer cylinder 50 is suppressed while preventing the increase of the tip margin region, such that the overall quality of the image formed on the recording medium P is improved.

Another Image Forming Apparatus

Figure 22:
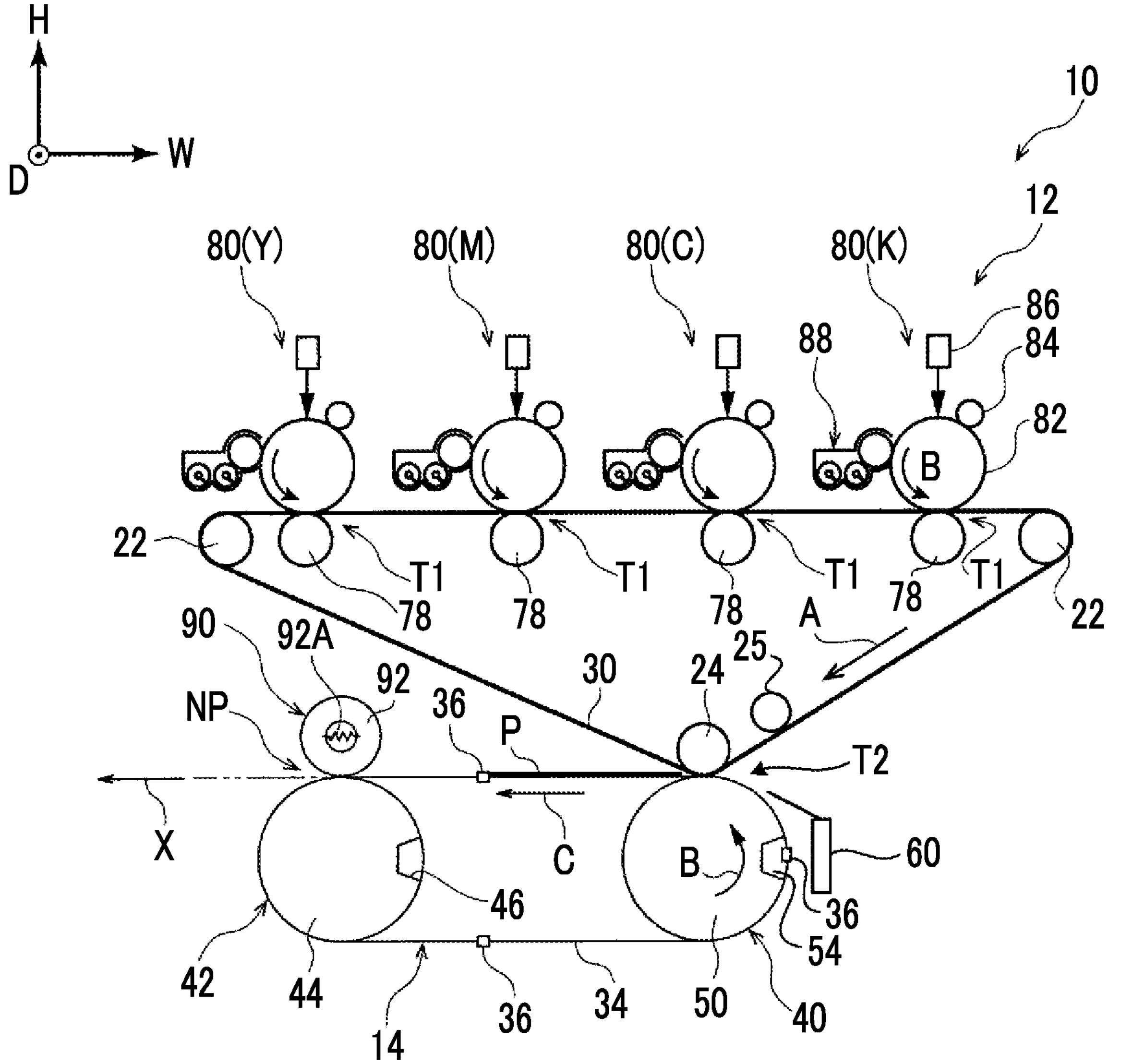
FIG. 22 is a schematic diagram showing the configuration of another image forming apparatus 10 according to an exemplary embodiment of the present invention.

FIG. 22 shows a schematic diagram showing a configuration of another image forming apparatus 10 according to an exemplary embodiment of the present invention. The image forming apparatus 10 according to the present exemplary embodiment is not limited to the ink-jet type as described above, and may be, for example, an electrophotographic type as shown in FIG. 22. That is, instead of the pressure-sensitive adhesive layer forming device 26, the particle supply device 18, and the discharge head 20, a toner image forming unit 80 for forming a toner image (an example of an image) of each color may be provided.

The toner image forming unit 80 (80Y, 80M, 80C, and 80K) of each color has a columnar photoreceptor 82 that rotates in one direction (arrow B direction) respectively, and a charger 84, an exposure device 86, and a developing device 88 are disposed around each photoreceptor 82 in order from the upstream side of the photoreceptor 82 in the rotation direction.

In the toner image forming unit 80 of each color, the charger 84 charges a surface of the photoreceptor 82, and the exposure device 86 exposes the surface of the photoreceptor 82 charged by the charger 84 to form an electrostatic latent image on the surface of the photoreceptor 82. Then, the developing device 88 develops the electrostatic latent image formed on the surface of the photoconductor 82 by the exposure device 86 to form a toner image.

On the inner circumferential surface side of the transfer belt 30, a primary transfer roll 78 facing each photoreceptor 82 with the transfer belt 30 interposed therebetween is provided. The toner images formed by the toner image forming unit 80 of each color are sequentially primarily transferred to the transfer belt 30 at a primary transfer position T1 in which the primary transfer roll 78 is provided and superimposed, and the superimposed toner image is secondarily transferred to the recording medium P at a secondary transfer position T2.

Others

The present invention is not limited to the above exemplary embodiment, and the design can be appropriately changed without departing from the gist of the present invention.

For example, in the above exemplary embodiment, by imparting a transport load to the transported recording medium P by the imparting portion such as the sliding member 60, the floating of the recording medium P from the transfer cylinder 50 is suppressed. However, the present invention is not limited to such a configuration. For example, it is also possible to use an air adsorption method in which the recording medium P is brought into close contact with the transfer cylinder 50 by negative pressure, or an electrostatic adsorption method in which the recording medium P is brought into close contact with the transfer cylinder 50 by electrostatic force by applying a voltage to the transfer cylinder 50.

Further, the cylinder main body 52 may be formed in a substantially columnar shape instead of a substantially cylindrical shape. Further, in the present exemplary embodiment, a toner image is taken as an example of the image, and the toner image is formed by a dry electrophotographic method, but the present invention is not limited to this. For example, a toner image formed by a wet electrophotographic method may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a holding body that holds a formed image;

a transport unit that transports a recording medium in a state where a tip of the recording medium is grasped by a grasping portion;

a transfer cylinder that has a substantially circular cross section, and that includes a concave portion that accommodates the grasping portion in a direction substantially orthogonal to a rotation direction and transfers an image on the holding body to the recording medium transported by the transport unit by interposing the recording medium transported by the transport unit between the transfer cylinder and the holding body; and an imparting portion is a sliding member that is disposed in close proximity without coming into contact with a surface of the transfer cylinder and is configured to impart a transport load to the recording medium that is transported to a transfer position at which the image on the holding body is transferred to the recording medium and to slide with respect to the recording medium being transported, wherein the transport load suppresses a floating of the recording medium from the transfer cylinder.

2. The image forming apparatus according to claim 1, wherein the holding body has a belt shape, the sliding member has a plate shape, the image forming apparatus further comprises an opposing roll that forms the transfer position by pressing the holding body from an inside, and a tip of the sliding member is disposed such that a distance from a center of the opposing roll to the tip of the sliding member is 50 mm or less and a distance from the surface of the transfer cylinder to the tip of the sliding member is 2 mm or less.

3. The image forming apparatus according to claim 1, wherein the imparting portion is a sliding member that is disposed so as to come into contact with a surface of the transfer cylinder and slides on the recording medium transported.

4. The image forming apparatus according to claim 1, wherein the sliding member is made of a material having a friction coefficient with the recording medium of 1.0 or more and 1.5 or less.

5. The image forming apparatus according to claim 2, wherein the sliding member is made of a material having a friction coefficient with the recording medium of 1.0 or more and 1.5 or less.

6. The image forming apparatus according to claim 3, wherein the sliding member is made of a material having a friction coefficient with the recording medium of 1.0 or more and 1.5 or less.

7. The image forming apparatus according to claim 1, wherein the imparting portion is a rotating member that is disposed in close proximity without coming into contact with a surface of the transfer cylinder and rotates in contact with the recording medium transported.

8. The image forming apparatus according to claim 7, wherein the holding body has a belt shape, the image forming apparatus further comprises an opposing roll that forms the transfer position by pressing the holding body from an inside, and a center of the rotating member is disposed such that a distance from a center of the opposing roll is 50 mm or less and a distance between a surface of the rotating member and the surface of the transfer cylinder is 2 mm or less.

9. The image forming apparatus according to claim 1, wherein the imparting portion is a rotating member that rotates in contact with a surface of the transfer cylinder.

10. The image forming apparatus according to claim 7, wherein the rotating member is configured to rotate due to a frictional force when the rotating member comes into contact with the recording medium.

11. The image forming apparatus according to claim 8, wherein the rotating member is configured to rotate due to a frictional force when the rotating member comes into contact with the recording medium.

12. The image forming apparatus according to claim 9, wherein the rotating member is configured to rotate due to a frictional force when the rotating member comes into contact with the recording medium.

13. The image forming apparatus according to claim 7, wherein the rotating member is configured to be driven by a driving force from an outside and rotate at a surface speed slower than a surface speed of the transfer cylinder.

14. The image forming apparatus according to claim 8, wherein the rotating member is configured to be driven by a driving force from an outside and rotate at a surface speed slower than a surface speed of the transfer cylinder.

15. The image forming apparatus according to claim 9, wherein the rotating member is configured to be driven by a driving force from an outside and rotate at a surface speed slower than a surface speed of the transfer cylinder.

16. The image forming apparatus according to claim 7, wherein the rotating member is made of a material having a friction coefficient with the recording medium of 1.0 or more and 1.5 or less.

17. The image forming apparatus according to claim 1, wherein at a tip of a surface in the concave portion of the transfer cylinder on a side that becomes a head in a rotation direction, an inclined surface is provided that is inclined as a distance from a rotation center to the surface increases toward a downstream side in the rotation direction.

18. The image forming apparatus according to claim 17, wherein the inclined surface is configured to be on a rotation center side of the transfer cylinder with respect to a surface including a grasping surface on which the grasping portion grasps the recording medium in a state where the grasping portion is accommodated in the concave portion.

19. The image forming apparatus according to claim 17, wherein an angle between the inclined surface and a plane orthogonal to a tip position of the inclined surface on a line in a rotation center direction of the transfer cylinder from the tip position of the inclined surface is smaller than an angle between a grasping surface on which the grasping portion grasps the recording medium and a plane orthogonal to a tip position of the grasping portion on a line in the rotation center direction of the transfer cylinder from the tip position of the grasping portion.

20. The image forming apparatus according to claim 1 further comprises:

an opposing roll that forms the transfer position by pressing the holding body from an inside, and a tip of the sliding member is disposed such that a distance from a center of the opposing roll to the tip of the sliding member is a first predetermined distance and a distance from the surface of the transfer cylinder to the tip of the sliding member is at a second predetermined distance less than the first predetermined distance.

* * * * *